(12) United States Patent
Wang et al.

(10) Patent No.: US 7,158,567 B2
(45) Date of Patent: Jan. 2, 2007

(54) METHOD AND APPARATUS FOR IMPROVED HIGH-SPEED FEC ADAPTIVE EQUALIZATION

(75) Inventors: John S. Wang, Sunnyvale, CA (US); Jeff Rahn, Mountain View, CA (US); Sudeep Bhoja, San Jose, CA (US)

(73) Assignee: Vitesse Semiconductor Corporation, Camarillo, CA (US)

( * ) Notice: Subject to any disclaimer, the term of this patent is extended or adjusted under 35 U.S.C. 154(b) by 49 days.

(21) Appl. No.: 10/810,271

(22) Filed: Mar. 26, 2004

(65) Prior Publication Data

US 2005/0008070 A1    Jan. 13, 2005

Related U.S. Application Data

(63) Continuation-in-part of application No. 10/677,123, filed on Sep. 30, 2003, now Pat. No. 7,003,228, which is a continuation-in-part of application No. 09/955,278, filed on Sep. 11, 2001.

(51) Int. Cl.
    *H03H 7/30* (2006.01)
(52) U.S. Cl. .......................... 375/232; 375/350; 708/323
(58) Field of Classification Search ................ 375/233, 375/350, 229, 285, 263, 232, 228, 236; 348/614, 348/726; 370/241; 333/18, 28 R; 708/322, 708/323
    See application file for complete search history.

(56) References Cited

U.S. PATENT DOCUMENTS

| | | | |
|---|---|---|---|
| 3,845,390 A | | 10/1974 | De Jager et al. |
| 4,032,762 A | * | 6/1977 | Caloyannides .............. 708/322 |
| 5,880,645 A | * | 3/1999 | Everitt et al. ................. 333/18 |
| 6,385,237 B1 | * | 5/2002 | Tsui et al. .................... 375/228 |
| 6,418,164 B1 | * | 7/2002 | Endres et al. ................ 375/232 |
| 6,490,007 B1 | * | 12/2002 | Bouillet et al. .............. 348/614 |
| 6,545,567 B1 | | 4/2003 | Pavan et al. |
| 6,570,943 B1 | * | 5/2003 | Goldston et al. ........... 375/350 |

(Continued)

FOREIGN PATENT DOCUMENTS

WO    WO 2005/034370 A2    4/2005

(Continued)

OTHER PUBLICATIONS

Ding, Z., et al., "On The Admissibility Of Blind Adaptive Equalizers", Acoustics, Speech, and Signal Processing, 1990, ICASSP-90, 1990 International Conference on Apr. 3-6, 1990, vol. 3 (pp. 1707-1710).

(Continued)

*Primary Examiner*—Temesghen Ghebretinsae
(74) *Attorney, Agent, or Firm*—Christie, Parker & Hale, LLP

(57) ABSTRACT

A method for performing adaptive equalization is presented comprising receiving a Forward Error Correction (FEC) encoded signal from a channel, filtering the received FEC encoded signal using a filter according to at least one adjustable filter coefficient to produce a filtered signal, evaluating the filtered signal to generate a signal error output, adjusting the at least one adjustable filter coefficient in response to the signal error output, performing FEC decode processing dependent on the filtered signal to generate an FEC output, and adjusting the at least one adjustable filter coefficient in response to the FEC output. In one embodiment, the signal error output relates to Mean Squared Error (MSE), and the FEC output relates to bit error rate. The at least one adjustable filter coefficient may be first adjusted in response to the signal error output until a specified condition is met, then adjusted in response to the FEC output.

16 Claims, 17 Drawing Sheets

U.S. PATENT DOCUMENTS

| | | | |
|---|---|---|---|
| 6,647,070 B1 * | 11/2003 | Shalvi et al. | 375/285 |
| 6,904,110 B1 * | 6/2005 | Trans et al. | 375/350 |
| 2002/0034222 A1 | 3/2002 | Buchwald et al. | |
| 2005/0129107 A1 * | 6/2005 | Park et al. | 375/233 |

FOREIGN PATENT DOCUMENTS

| | | |
|---|---|---|
| WO | WO 2005/034370 A3 | 9/2005 |

OTHER PUBLICATIONS

Macchi, O., et al., "Convergence Analysis Of Self-Adaptive Equalizers", Information Theory,IEEE Transactions, vol. 30, Issue 2, Mar. 1984 (pp. 161-176).

Ungerboeck, G., "Nonlinear Equalization Of Binary Signals In Gaussian Noise", Communications, IEEE Transactions on [legacy, pre-1988] vol. 19, Issue 6, Part 1, Dec. 1971 (pp. 1128-1137).

Dualibe, C., et al., "Embedded Fuzzy Control For Automatic Channel Equalization After Digital Transmissions", Circuits and Systems, 2001, ISCAS 2001. The 2001 IEEE International Symposium, vol. 3, May 6-9, 2001 (pp. 173-176).

Wang, J., Office Action for U.S. Appl. No. 09/955,278, filed Sep. 11, 2001, entitled "Method And Apparatus For Improved High-Speed Adaptive Equalization", Office Action Mailed Dec. 13, 2005 (15 pgs.).

Glentis, G.-O,., et al., "Efficient Least Squares Adaptive Algorithms For FIR Transversal Filtering", Signal Processing Magazine, IEEE Signal Processing Magazine, vol. 16, Issue 4, Jul. 1999 (pp. 13-41).

Glentis, G.-O.A., et al., "Fast Adaptive Algorithms For Multichannel Filtering And System Identification", IEEE Transactions on Signal Processing, vol. 40, Issue 10, Oct. 1992 (pp. 2433-2458).

Qureshi, S.U.H., "Adaptive Equalization", Proceedings of the IEEE, vol. 73, Issue 9, Sep. 1985 (pp. 1349-1387).

Monteiro, P. et al. 40 Gbit/s Electrically Adjustable Post-detection Filter. [retrieved on Mar. 19, 2004], Retrieved from the Internet: <URL: www.fub.it/atlas/TF_technical.doc>, 4 pages.

Godard, D. (1980). "Self-Recovering Equalization and Carrier Tracking in Two-Dimensional Data Communication Systems," IEEE Transactions on Communications, vol. Com-28, No. 11, 1867-1875.

* cited by examiner

METHOD AND APPARATUS FOR IMPROVED HIGH-SPEED FEC ADAPTIVE EQUALIZATION

CROSS-REFERENCES TO RELATED APPLICATIONS

This application is a continuation-in-part of Ser. No. 10/677,123, filed Sep. 30, 2003, now U.S. Pat. No. 67,003,228 entitled "Method and Apparatus for Improved High-Speed Adaptive Equalization," having John S. Wang, Sudeep Bhoja, Shanthi Pavin and Hai Tao listed as co-inventors, which is a continuation-in-part of U.S. application Ser. No. 09/955,278, filed Sep. 11, 2001, entitled "Method and Apparatus for Improved High-Speed Adaptive Equalization," having John Wang, Sudeep Bhoja and Shanthi Pavin listed as co-inventors. The Ser. Nos. 10/677,123 and 09/955,278 applications are assigned to Big Bear Networks, the assignee of the present invention and is hereby incorporated by reference.

BACKGROUND OF THE INVENTION

1. Field of the Invention

The current invention relates to the field of signal equalization, particularly to enabling improved high-speed adaptive equalization.

2. Description of Related Art

Increased demand for high-speed communications services has required that economical and efficient new devices and techniques be developed to support performance increases. For example, as transmission rates climb to the 10–40 Gbps range and beyond in modern optical networks, signal processing and conditioning techniques must be applied to filter out noise and reduce interference such as inter-symbol interference (ISI). Typical optical networks are plagued by noise and bandwidth limitations caused by polarization mode dispersion, modal dispersion, chromatic dispersion, limited component bandwidth, and/or other undesired phenomena. Such effects often cause problems such as group delay distortion, frequency-related attenuation, and/or others. Furthermore, the ISI can be time varying due to a variety of causes such as physical vibration, mechanical stresses and temperature fluctuations. Typically, optical receivers may use devices such as equalizers to improve the overall performance of such systems and minimize the error rate. However, the implementation of such devices has proven to be challenging and costly.

Equalizers based on transversal filters have been promoted as a way of removing noise and inter-symbol interference in some systems. For example, FIG. 1 (prior art) illustrates an example of a proposed transversal filter based equalizer 10 controlled by a microprocessor 50. In this example, the coefficients for the transversal filter may be set by the adaptation logic module, a microprocessor 50, based on analysis of eye monitor 30 data. For example, FIGS. 2a and b illustrate examples of eye patterns. Ideally, the eye monitor output would correlate well with bit-error rate (BER) of the sampled data. For example, the Mean Squared Error (MSE) of the eye measured at the sampling point should correlate with the bit-error rate for a signal with additive white Gaussian noise (AWGN). MSE-based eye monitors can be used to optimize eyes even in the presence of large amounts of ISI such as that shown in FIG. 2b. In practice, eye monitors will not be perfect predictors of BER. For example, the eye monitor's sampling point may be offset relative to the decision point. The decision threshold may also be different between the eye monitor and the data sampler. Actual noise characteristics might differ from those assumed in designing the eye monitor. For example, multiplicative noise may predominate in the actual system, even though additive noise may have been assumed in the design of the eye monitor.

In order to get a better prediction of BER, equalizers using forward-error-correction (FEC) feedback have been used. For example, Haunstein, Schlenk, and Sticht describe a method that compares the corrected data output of an FEC with the uncorrected data and uses the result to adjust coefficients of an equalizer. One of the benefits of using FEC feedback to determine coefficients of an equalizer is that the FEC feedback information is a good indication of the bit error rate, which can be effectively minimized. However, equalization based on FEC feedback typically requires a low bit error rate associated with FEC decoding. Higher bit error rates, which may be associated with noise and/or interference such as ISI, can cause the equalization process to converge too slowly or fail to converge at all. Thus, equalization based on FEC feedback may very well be inoperable under certain noise and/or interference conditions. FEC decoding may become impossible when the input BER is large. For example, an FEC processor may not decode the signal shown in FIG. 2b correctly, and thus the BER estimate would be meaningless.

Accordingly, it is desirable to achieve high-speed adaptive equalization that can effectively operate, even for systems experiencing severe distortion. This equalizer should be able to obtain comparable performance as one optimized using BER.

BRIEF SUMMARY OF THE INVENTION

In accordance with the invention, a method provided for performing adaptive equalization comprising receiving a Forward Error Correction (FEC) encoded signal from a channel, filtering the received FEC encoded signal using a filter according to at least one adjustable filter coefficient to produce a filtered signal, evaluating the filtered signal to generate a signal error output, adjusting the at least one adjustable filter coefficient in response to the signal error output, performing FEC decode processing dependent on the filtered signal to generate an FEC output, and adjusting the at least one adjustable filter coefficient in response to the FEC output. Thus, in at least one embodiment of the invention, a controller responsible for adjusting the at least one adjustable filter coefficient has access to two sources of information regarding the quality of the filter output: a signal error output which can reflect the output of an eye monitor and an FEC output which may be more indicative of the bit-error rate. The controller can select between the two sources of information to ensure that the system has all of the strengths of both types of information. The signal error output generally has a fast response time and the ability to recover badly distorted signals. The FEC output generally has the ability to accurately monitor BER in the presence of nonlinearities and nonidealities in the system.

In a specific embodiment, the signal error output relates to Mean Squared Error (MSE), and the FEC output relates to bit error rate. According to one embodiment, the at least one adjustable filter coefficient is first adjusted in response to the signal error output until a specified condition is met, then adjusted in response to the FEC output. The specified condition may be based on the signal error output or the FEC output. The specified condition may relate to an error measure falling below a predetermined level. The specified condition may also relate to an error measure varying less than a predetermined amount in N iterations of adjusting the at least one adjustable filter coefficient, where N is a positive integer.

Further, the at least one adjustable filter coefficient may be selectively adjusted in response to the signal error output or the FEC output, based on a measurement of time-dependent variation of the channel. Advantageously, the current invention may be used to address the types of time-varying noise and interference typical of common, high-speed optical communication systems.

DETAILED DESCRIPTION OF THE INVENTION

Controllable Analog Filter

Figure 3:
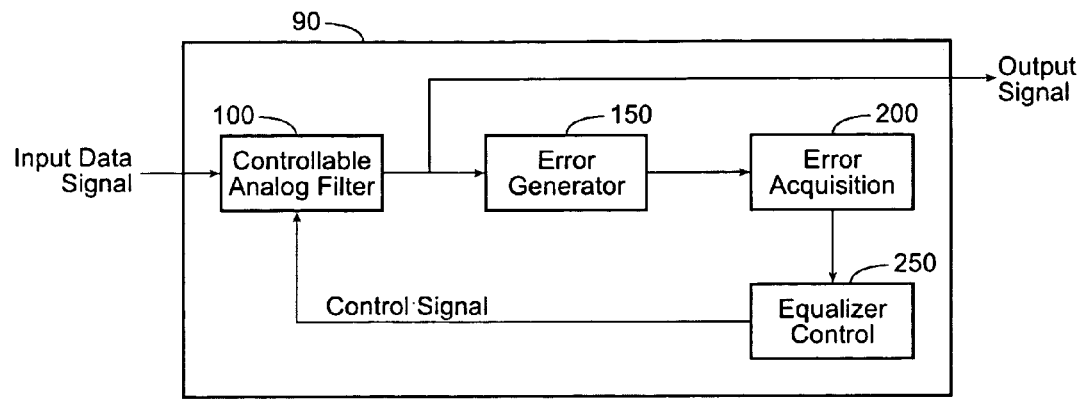
FIG. 3 illustrates a preferred embodiment of the current invention.
Figure 4:
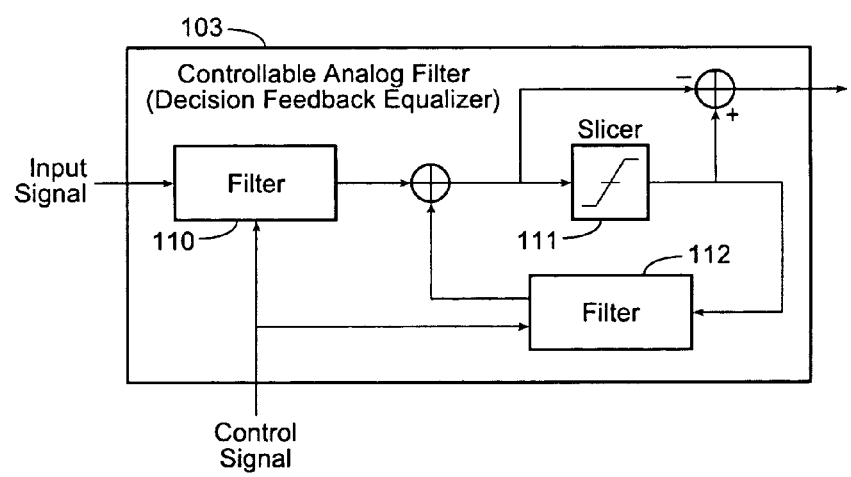
FIG. 4 illustrates an example of a controllable analog filter comprising two filters implemented in a decision feedback equalizer (DFE) configuration according to an alternate embodiment of the current invention.
Figure 5:
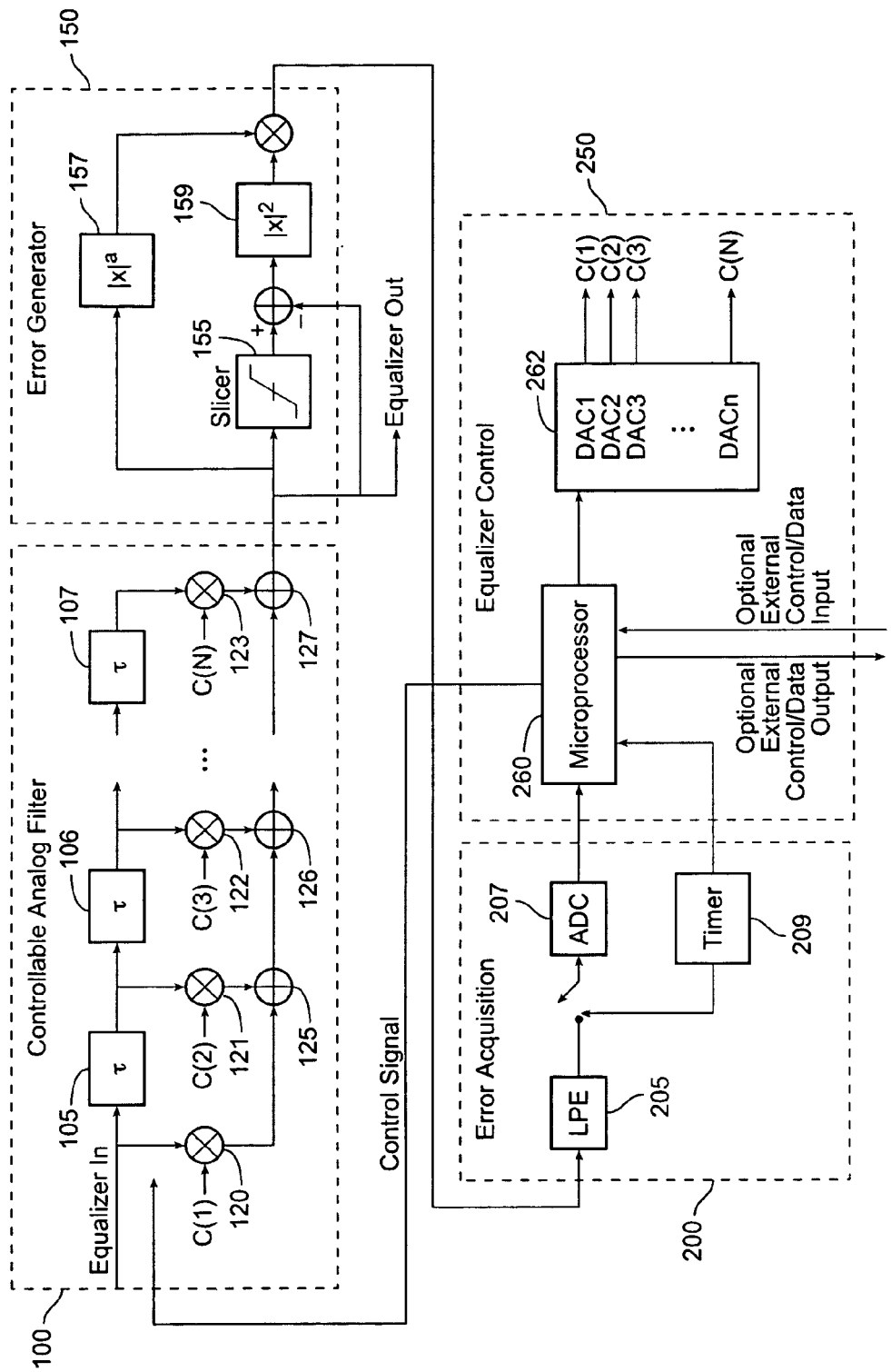
FIG. 5 illustrates a detailed view of a preferred embodiment of the current invention.

FIG. 3 illustrates a preferred embodiment of the current invention 90. According to a preferred embodiment of the current invention, one or more data signals may be received by the controllable analog filter 100. Typically, the data signals may be analog, digital and/or sampled analog signals. Preferably, the one or more controllable analog filters serve to filter out noise and compensate for channel impairment or imperfections such as inter-symbol interference (ISI). In this example, a single controllable analog filter 100 is used. However, according to alternate embodiments of the current invention, one or more controllable analog filters may be used in various configurations. Furthermore, in some cases, a single controllable analog filter may comprise two or more filters. For example, FIG. 4 illustrates an example of a controllable analog filter 103 comprising two filters 110 and 112 implemented in a decision feedback equalizer (DFE) configuration according to an alternate embodiment of the current invention. FIG. 5 illustrates a detailed view of a preferred embodiment of the current invention. In this example, controllable analog filter 100 is implemented as a transversal filter using a set of N analog delay lines 105, 106 and 107, a set of multipliers 120, 121, 122, 123, and a set of adders 125, 126, and 127 to provide a weighted sum of delayed versions of the input signal or signals. In this example, N analog delay lines are illustrated. However, according to alternate embodiments of the current invention, transversal filters with one or more analog delay lines may be used. Typically, analog delay lines used in a transversal filter such as 105, 106 and 107 will have similar, but not identical delays. However, according to various embodiments of the current invention, the delays associated with analog delay lines 105, 106 and 107 may or may not vary widely. Referring to FIG. 5, in this example, coefficients are used as input to multipliers 120, 121, 122 and 123 for the purpose of controlling the controllable analog filter 100. According to a preferred embodiment of the current invention, the initial coefficients may be set to a "pass-through" value allowing the input signal or signals to traverse the controllable analog filter unchanged for assessment by the error generator 150. Preferably, new coefficient values may then be calculated based on the initial signal. However, according to alternate embodiments of the current invention, the initial coefficients may be set to a previously configured value or received from an external source. Alternately, the initial coefficients may be set to a previously stored value. For example, the coefficients may be initialized based on coefficient values calculated or used in prior operation of the controllable analog filter.

Figure 9:
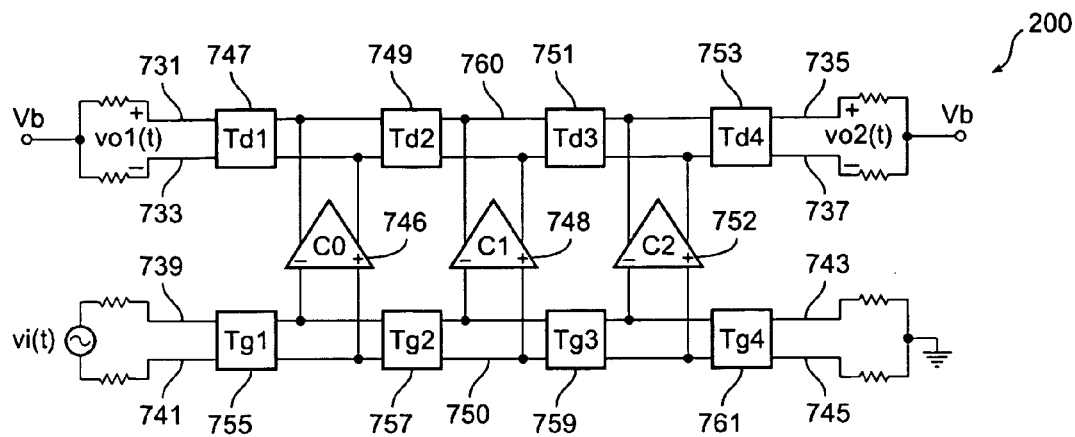
FIG. 9 illustrates one embodiment of the present invention wherein the controllable analog filter is implemented as a tapped delay line filter employing differential delay cells.

FIG. 9 illustrates one embodiment of the present invention wherein the controllable analog filter is implemented as a tapped delay line filter employing differential delay cells. FIG. 9 illustrates a circuit 200 comprising: an input line denoted 750, comprising differential delay cells denoted 755, 757, 759, and 761; an output line denoted 760, comprising differential delay cells denoted 747, 749, 751, and 753; three gaincells or taps denoted 746, 748, and 752, each gaincell or tap comprises a tap weight denoted C0, C1, and C2 respectively; and two output signals vo1(t) and vo2(t).

As illustrated in FIG. 9, input line 50 terminates in impedances denoted 739, 741, 743, and 745; and output line 760 terminates in impedances denoted 731, 733, 735, and 737. Differential delay cells 755, 757, 759, and 761 are coupled in series along input line 750, and differential delay cells 747, 749, 751, and 753 are coupled in series along output line 760. Moreover, gaincells or taps 746, 748, and 752 are coupled between input line 750 and output line 760.

The gaincells or taps 746, 748, and 752 are differential amplifiers with programmable gain, whose output current is proportional to the input voltage; and the gaincells may be implemented with active devices such as bipolar junction transistors, Metal-Oxide-Semiconductor FETs, Heterojunction devices, etc.

Each of the gaincells or taps 746, 748, and 752 correspond to a tap weight or coefficient C0, C1, and C2 respectively. Moreover, each tap weight or coefficient may vary both in its sign and its value independently of any other tap weight or coefficient.

Figure 10:
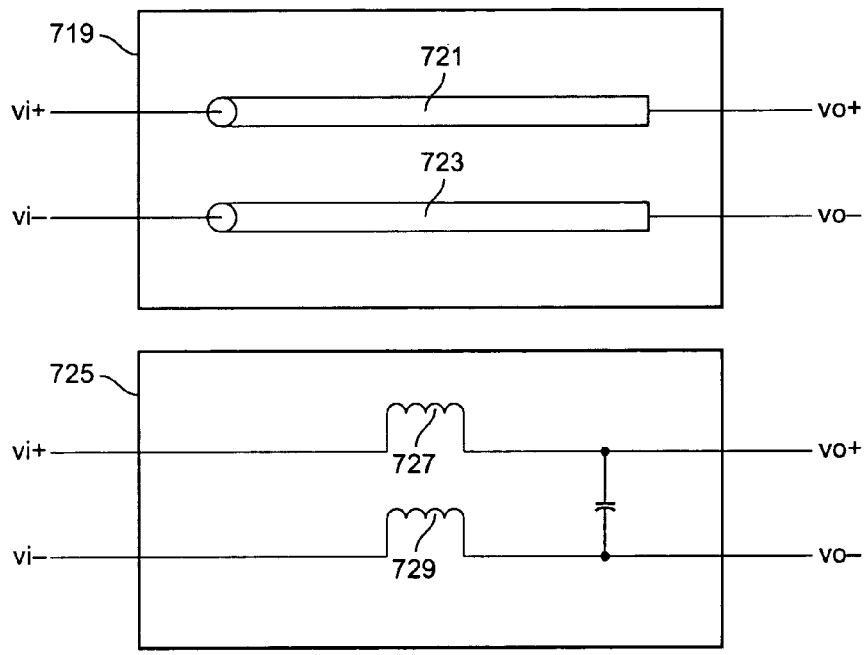
FIG. 10 illustrates two examples of implementations of the differential delay cells shown in FIG. 9.

Differential delay cells 747, 749, 751, 753, 755, 757, 759, and 761 may be implemented with one of several methods. FIG. 10 illustrates two such implementations denoted 719 and 725. The first approach 719 for implementing a differential delay cell comprises transmission lines 721 and 723 that may be physical waveguides constructed from materials such as micro strips. In cases where the delays are large, the second approach 725 for implementing a differential delay cell may be employed where two inductors are coupled together with a capacitor. Moreover, each differential delay cell is characterized by:

$$vo_+(t) - vo_-(t) = vi_+(t-T) - vi_{31}(t-T)$$

where T represents delay period for each differential delay cell.

FIG. 9 further illustrates two output signals vo1(t) and vo2(t) at either end of output line 60. Furthermore, the output signals vo1(t), vo2(t), and the input signal vi(t) are characterized by the following equations:

$$vo1(t) = C0*vi(t-T1) + C1*vi(t-T2) + C2*vi(t-T3)$$

$$vo2(t) = C0*vi(t-T4) + C1*vi(t-T5) + C2*vi(t-T6)$$

where the variables T1, T2, T3, T4, T5, and T6 are represented by:

$$T1 = Tg1 + Td1$$

$$T2 = Tg1 + Td1 + Tg2 + Td2$$

$$T3 = Tg1 + Td1 + Tg2 + Td2 + Tg3 + Td3$$

$$T4 = Tg1 + Td2 + Td3 + Td4$$

$$T5 = Tg1 + Tg2 + Td3 + Td4$$

$$T6 = Tg1 + Tg2 + Tg3 + Td4$$

where Tg1, Tg2, Tg3, and Tg4 are delay periods for the four input differential delay cells 755, 757, 759, and 761 respectively; and Td1, Td2, Td3, and Td4 are delay periods for the four output differential delay cells 747, 749, 751, and 753 respectively.

Further details relating to such a programmable analog tapped delay line filter having cascaded differential delay cells are provided in U.S. Pat. No. 6,545,567, the contents of which are hereby incorporated by reference.

Error Generator

Figure 6:
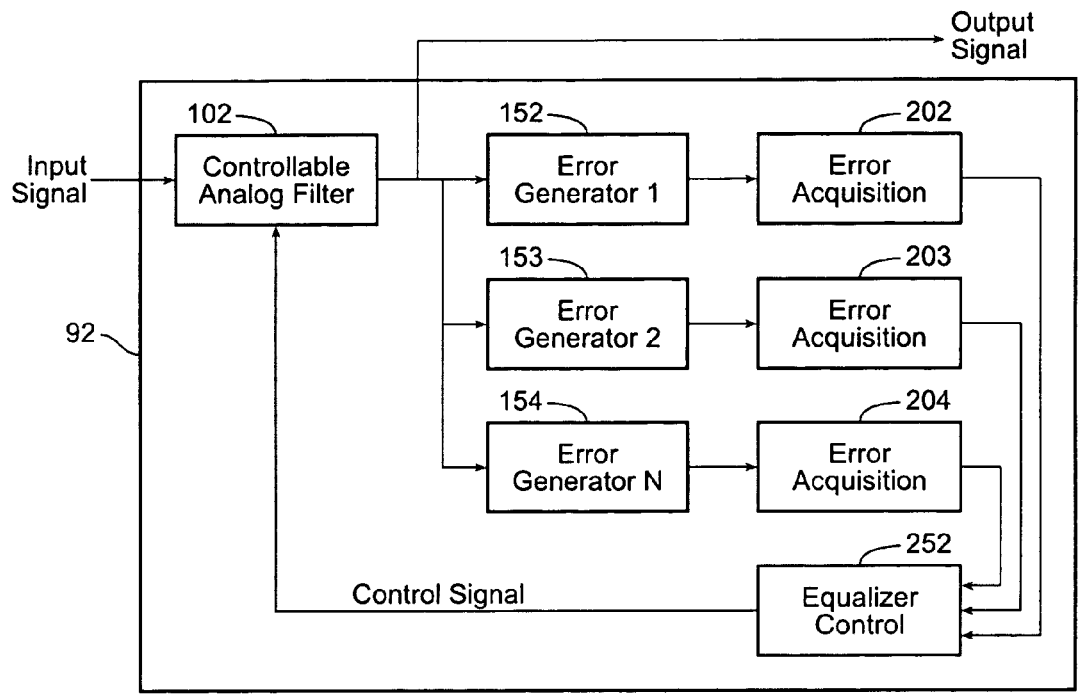
FIG. 6 illustrates an alternate embodiment of the current invention.

According to a preferred embodiment of the current invention, one or more processed signals may be output by the controllable analog filter or filters. Preferably, the output signal may be provided as input to one or more error generators as well as output from the adaptive equalizer. Referring to FIG. 3, the output of controllable analog filter 100 is routed to error generator 150 and provided as output from the adaptive equalizer 90. However, according to alternate embodiments of the current invention, the output of controllable analog filter 100 may be further processed before it is provided as output from the adaptive equalizer device. For example, in some cases, a slicer, such as slicer 155, may process the output of the controllable analog filter before it is provided as output from the adaptive equalizer device. FIG. 6 illustrates an alternate embodiment 92 of the current invention. In this example, equalizer 92 comprises three error generators 152, 153 and 154. According to alternate embodiments of the current invention, the use of two or more error functions may be used in conjunction with one or more equalizer control algorithms to enable the effective use of error functions with numerous local minima. In some cases, applying a minimization algorithm to the output of an error function with numerous local minima may prevent the minimization algorithm from converging properly to the appropriate minimum if the controllable analog filter is started with wrong initial coefficient values. To address this issue, a coarse equalization may be performed with a first error function and minimization algorithm for the purpose of roughly setting the initial coefficient values such that the equalizer may operate in a regime where a second, finer error function may be used. According to alternate embodiments of the current invention, one or more of the error generators may comprise an eye monitor. Referring to FIG. 5, a detailed embodiment of a preferred implementation of error generator 150 illustrates an example of an error function that may be used. In this example, the absolute value of the difference between slicer 155 input and slicer 155 output is squared and assessed as the error minimization function. The absolute value and squaring functions are represented here by a block 159. Preferably, the signal data may be massaged by applying one or more functions to the signal before the error function is applied. For example, depending on the nature of the input signal, it may be advantageous to apply a level shift and/or normalization function to the signal data such that the intensity values corresponding to a "low" signal are adjusted to reflect a negative intensity while intensity values corresponding to a "high" signal are adjusted to reflect a positive intensity. According to alternate embodiments of the current invention, alternate error functions may be implemented.

Furthermore, in one embodiment, a clock and/or clock recovery circuit may be used in conjunction with a typical eye monitor for assessing a single point on a bit interval. In an alternative embodiment, a clock and/or clock recovery circuit is not required. For example, in an un-clocked embodiment, typically, two or more points may be assessed using one or more error functions across a bit interval and the use of a clock and/or clock recovery circuit is not required. A clocked embodiment may provide better performance, while an un-clocked embodiment may allow for simpler configuration.

Figure 2A:
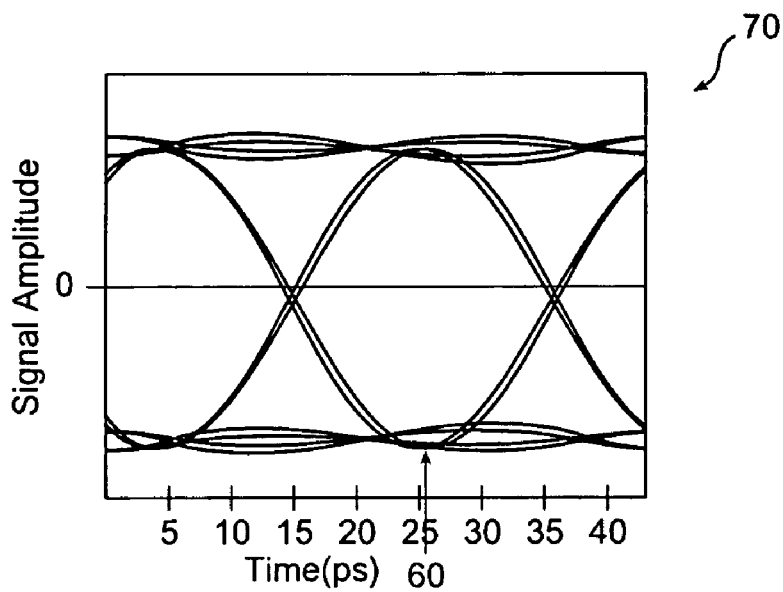
FIGS. 2a–2b illustrate examples of eye patterns.
Figure 2B:
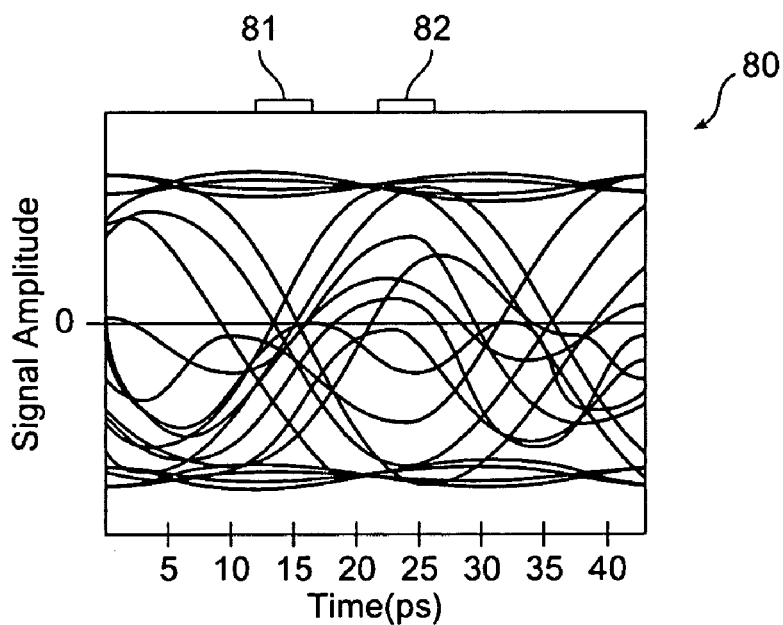

Optionally, a weighting function 157 may be used to create a weighted error function. For example, considering the eye pattern of an incoming signal, a time-weighted error function may be useful for de-emphasizing the error signal corresponding to the error signal near the zero crossings of the "eye" in an eye pattern and emphasizing the error signal near the middle of the "eye". Referring to eye pattern 80 in FIG. 2b, region 81 corresponds to a zero crossing of the "eye" and region 82 corresponds to the middle of the "eye". According to a preferred embodiment of the current invention, the weighting function may be provided with a processed signal, such as the output of the controllable analog filter. For example, raising the absolute value of a processed signal to a power may be used as a weighting function to emphasize the error signal near the middle of the "eye" and de-emphasize the error signal near the zero crossings of the "eye" without requiring the use of a clock. However, in alternate embodiments according to the current invention the weighting function may use other input such as input from a clock instead of or in addition to processed or unprocessed signal data as input. In this case, a clock or clock recovery system may be internal to or external to the current invention.

Error Functions

Figure 11:
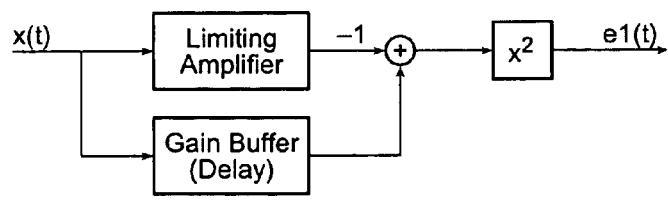
FIG. 11 shows one implementation for generating an error function e1(t) in accordance with one embodiment of the invention.

As discussed previously, according to alternate embodiments of the current invention, alternate error functions may be implemented in error generator 150. According to one embodiment, an error function referred to here as e1(t) may be defined as:

$$e1(t)=(x(t)-sgn(x(t)))^2$$

where x(t) is an input signal and sgn( ) denotes the signum function. FIG. 11 shows one implementation for generating e1(t). The input signal x(t) is sent to two blocks. The first block computes sgn(x(t)) by using a limiting amplifier whose output is either 1 (if x(t)>0) or −1 (if x(t)<0). Since the limiting amplifier has a finite bandwidth, there is a delay D1 between when a signal enters the limiting amplifier and when the limited output appears at the output of the limiting amplifier. The purpose of the gain buffer shown in FIG. 11 is to compensate for this delay so that the output of the subtractor is x(t−D2)−sgn(x(t−D1)). If the D1 is chosen so that D1=D2 then the output of the subtractor is x(t−D2)−sgn(x(t−D2)). Squaring the output of the subtractor would then produce a delayed version of the desired error signal.

Figure 12A:
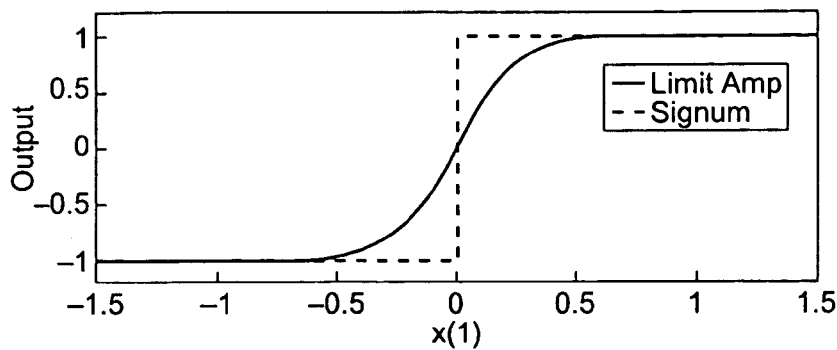
FIG. 12a is a graphical illustration comparing the functions of a limiting amplifier and that of an ideal signum function.
Figure 12B:
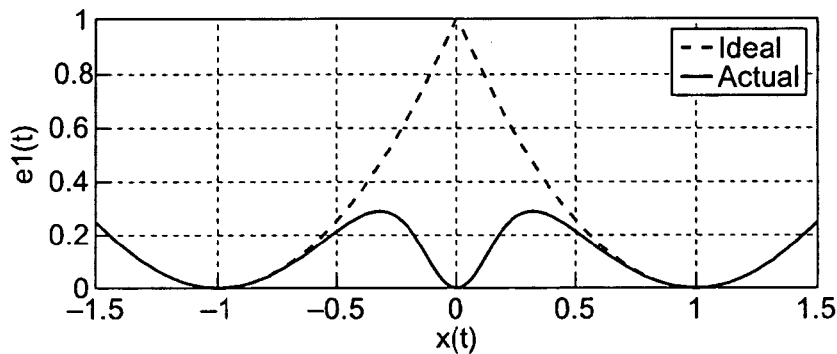
FIG. 12b is a graphical illustration comparing the actual e1(t) output resulting from use of a limiting amplifier and an ideal e1(t) output resulting from use of a signum function.

FIG. 12a is a graphical illustration comparing the functions of a limiting amplifier and that of an ideal signum function. As shown in FIG. 12a, the limiting amplifier in practice likely has a finite gain so that it is only an approximation of the signum function. As a result, the actual e1(t) output generated by the use of a limiting amplifier shown in FIG. 11 deviates from the ideal e1(t) output. FIG. 12b is a graphical illustration comparing the actual e1(t) output resulting from use of a limiting amplifier and an ideal e1(t) output resulting from use of a signum function. When the input x(t) is large the output of the limiting amplifier is saturated and the actual e1(t) output is close to the ideal e1(t) output. However when the input x(t) is small the output of the limiting amplifier is not saturated and the actual e1(t) output deviates from ideal e(t) output. This behavior causes the actual e1(t) output to have an undesirable, additional local minimum when x(t) is zero, which may cause the equalizer to converge to the wrong solution. Thus, the error function e1(t) may be implemented using a simple configuration involving a limiting amplifier as shown in FIG. 11, but such an implementation may lead to incorrect convergence of the equalizer.

According to another embodiment, an alternate error function referred to here as e2(t) maybe defined as:

$$e2(t)=(1-|x(t)|)^2$$

Figure 13A:
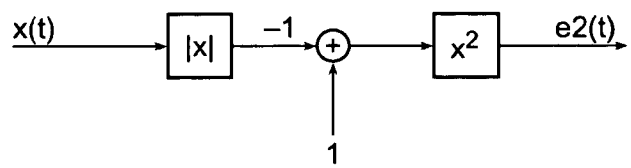
FIG. 13a shows an ideal implementation for generating an error function e2(t).
Figure 13B:
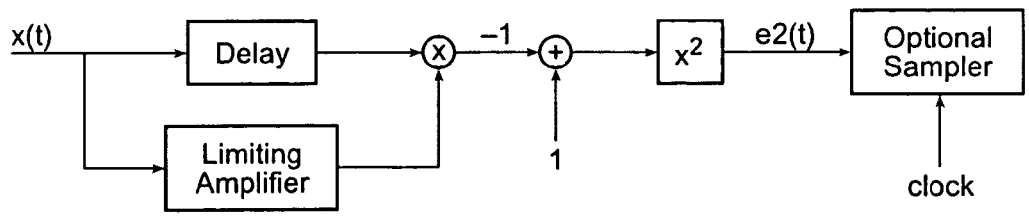
FIG. 13b shows a more practical implementation for generating the error function e2(t).

FIG. 13a shows an ideal implementation for generating e2(t). FIG. 13b shows a more practical implementation for generating e2(t). In FIG. 13a and FIG. 13b, an absolute value of the input signal, or an equivalent, is computed. Next, the difference between a fixed offset and |x(t)| is computed and squared. The error function e2(t) can be a substitute for the error function e1(t), as explained below:

$$e1(t)=(x-sgn(x(t)))^2$$

$$e1(t)=x(t)^2-2x(t)*sgn(x(t))+sgn(x(t))^2$$

Since sgn(x(t)) is either 1 or −1, sgn(x(t))^2 is always equal to one. Also, x(t)*sgn(x(t)) is the same as |x| so that:

$$e1(t)=x^2-2|x(t)|+1$$

$$e1(t)=(1-|x(t)|)^2, \text{ since } x(t)^2 \text{ is equal to } |x(t)|^2$$

Figure 1:
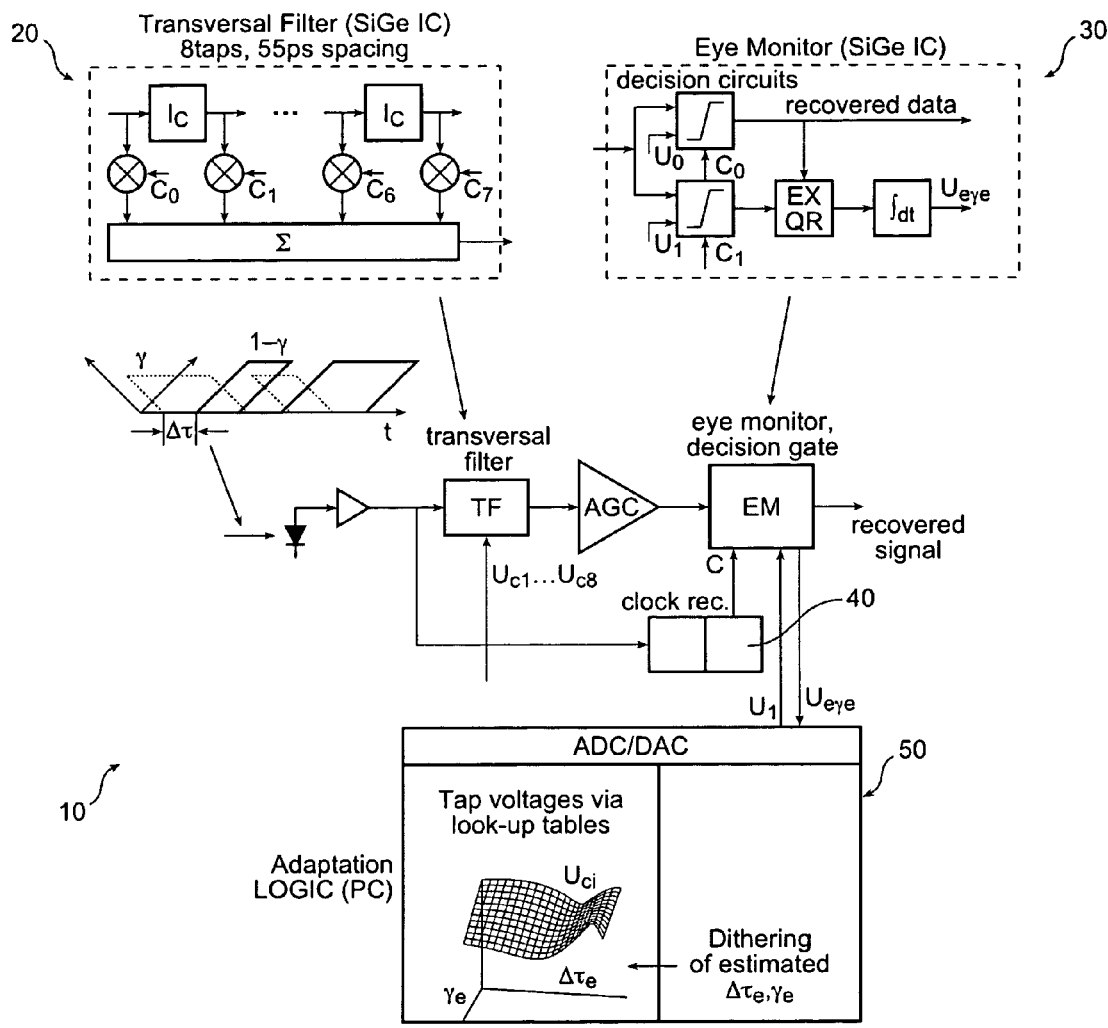
FIG. 1 (prior art) illustrates an example of a proposed transversal filter based equalizer controlled by a microprocessor.
Figure 14:
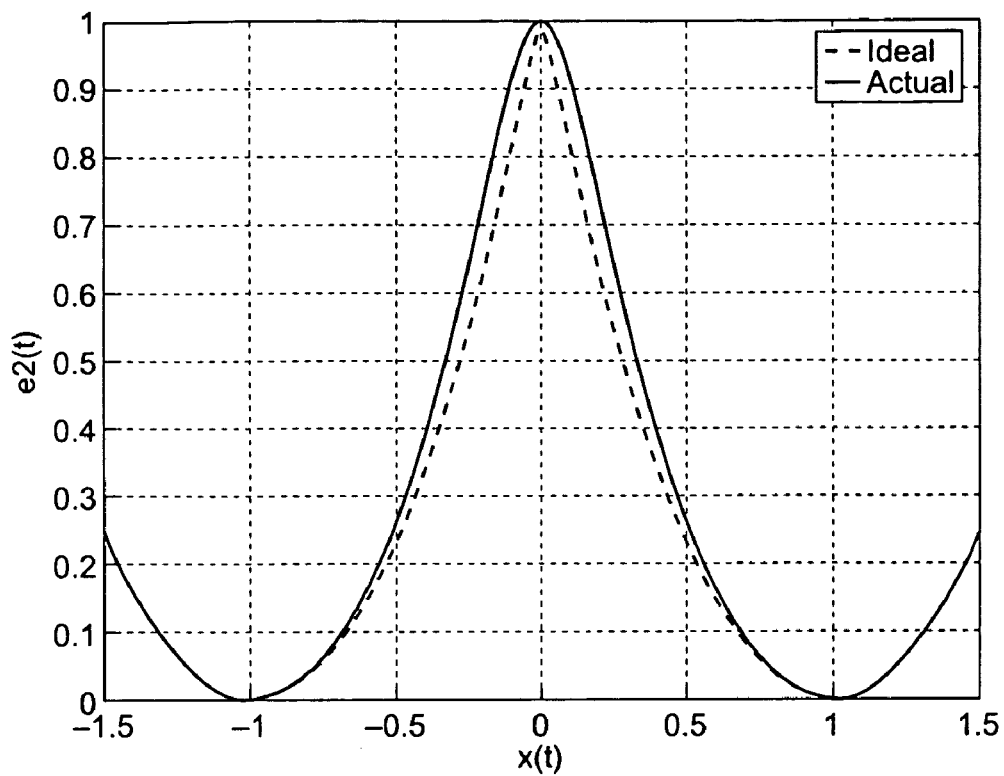
FIG. 14 shows the actual and ideal outputs of e2(t) as functions of x(t).
Figure 15:
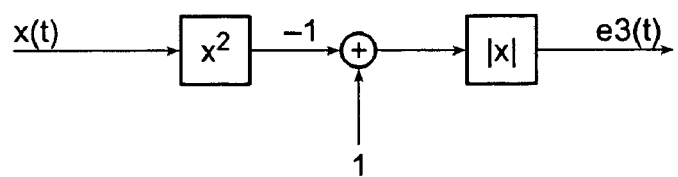
FIG. 15 shows an implementation for generating an error function e3(t) in accordance with one embodiment of the invention.
Figure 16:
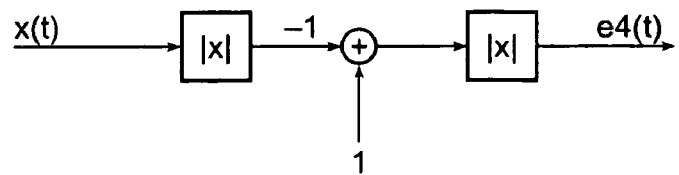
FIG. 16 shows an implementation for generating an error function e4(t) in accordance with one embodiment of the invention.

In practice, the absolute value function is implemented as the product of x(t) and sgn(x(t)), and sgn(x(t)) is implemented using a limiting amplifier as illustrated before. Unlike the implementation of e1(t) shown in FIG. 1, the implementations of e2(t) shown in FIGS. 13a and 13b are unlikely to have an undesirable, additional local minimum when x(t) is zero, even when output of the limiting amplifier is non-ideal. Thus, the illustrated implementations of e2(t) effectively prevent the equalizer from converging to the wrong solution. FIG. 14 shows the actual and ideal outputs of e2(t) as functions of x(t).

Several other implementations are listed below, which are also less sensitive to non-idealities of the limiting amplifier:

$$e3(t)=|1-x^2| (\text{FIG. }15)$$

$$e4(t)=|1-|x|| (\text{FIG. }16)$$

Figure 17:
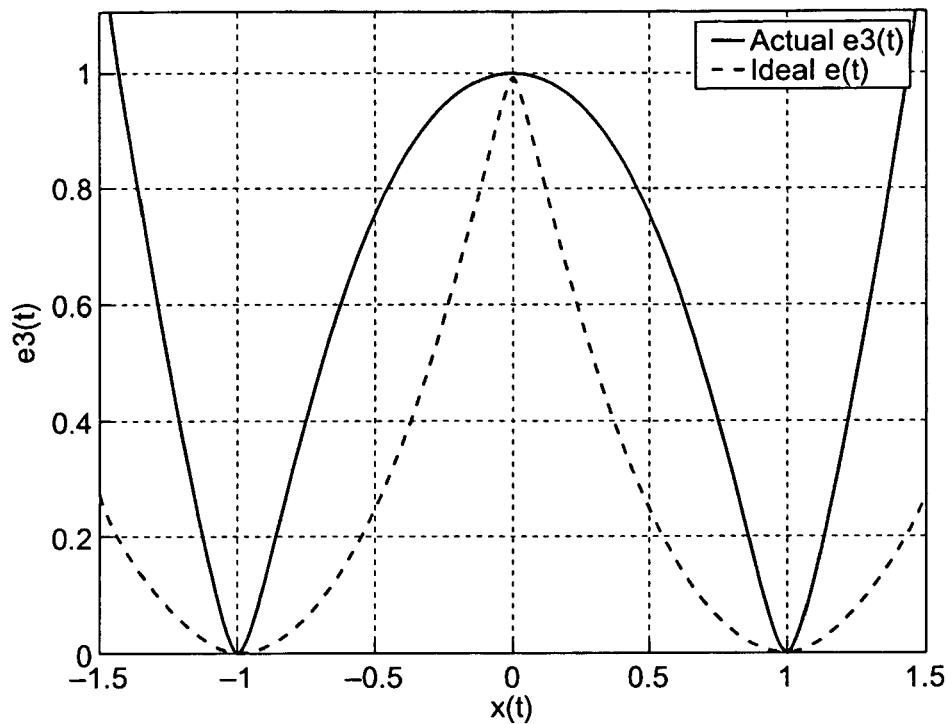
FIG. 17 shows the performance of e3(t) when the absolute value functions are implemented as the product of a limiting amplifier output and a delay.
Figure 18:
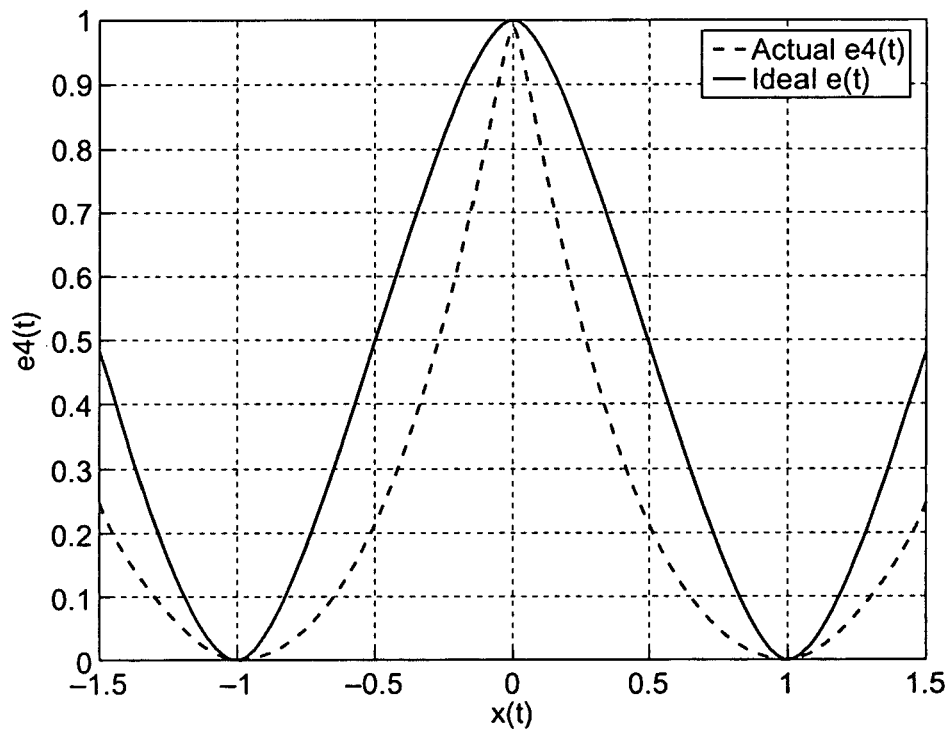
FIG. 18 shows the performance of e4(t) when the absolute value functions are implemented as the product of a limiting amplifier output and a delay.

Although they do not necessarily calculate the original function e(t) exactly, these error functions are still suitable for equalization purposes. FIGS. 17 and 18 show the performance of e3(t) and e4(t), respectively, when the absolute value functions are implemented as the product of a limiting amplifier output and a delay as described earlier.

For simplicity of illustration, all of the error functions listed above are shown with an original data signal of 1 or −1. However, the error function can also accommodate data signal having values of d or −d. The resultant error functions may be as follows:

$$e2(t)=(d-|x|)^2$$

$$e3(t)=d^2-|x|^2$$

$$e4(t)=|d-|x||$$

Error Acquisition

Preferably, the error generator output signal is further processed before it is provided to one or more equalizer controllers. Preferably, the error generator output signal is provided to one or more error acquisition blocks for filtering according to one or more acquisition filters. Typically, an acquisition filter may comprise one or more anti-aliasing filters, noise reduction filters, low pass filters and/or integrators. Preferably, the frequency characteristics of the signal may be altered. Preferably, the error acquisition block samples the signal so that it may be provided to an equalizer controller at a rate consistent with the operation of that equalizer controller. Referring to FIG. 5, a low pass filter (LPF) 205 is used to execute an averaging operation on incoming data from the error generator according to a preferred embodiment of the current invention. Typically, this serves to prevent aliasing and reduces noise in the incoming data signal. According to alternate embodiments of the current invention, an integrator may be used in addition to or instead of one or more LPFs. According to an alternate embodiment of the current invention, two or more error acquisition modules 202, 203, 204 may be implemented as illustrated in FIG. 6. Referring again to FIG. 5, preferably, an analog to digital converter (ADC) 207 may be used prepare the processed signal for output to the equalizer control module. Typically, an equalizer control module 250 may be used to control the sampling rate or data acquisition intervals. Optional timer 209 may be used to control acquisition intervals for sampling at a constant rate. Alternately, the sampling rate and/or data acquisition interval may not be controlled by the equalizer control module 250. Typically, in this case, the equalizer control module 250 may discard unwanted or unprocessable data.

According to a preferred embodiment of the current invention, the high-speed adaptive equalizer device may operate iteratively. The word iteratively, as applied to the operation of the current invention, is contemplated to include repeating one or more steps as part of the process of converging to a new or optimized set of filter values. Alternately, one or more steps may be repeated as part of the process of responding dynamically to signals with time-varying noise and interference characteristics. For example, the steps of data sampling, data filtering, error assessment, error acquisition, error function application, minimization algorithm application, weighting function application, coefficient calculation and/or coefficient setting may be done iteratively.

Equalizer Control

Preferably, one or more equalizer control modules may receive processed signals from one or more error acquisition modules. FIG. 6 illustrates an alternate embodiment of the current invention wherein a single equalizer control module 252 receives processed data signals from error acquisition modules 202, 203 and 204. FIG. 5 illustrates a preferred embodiment of the current invention wherein a single equalizer control module 250 receives processed data signals from error acquisition module 200. Typically, the equalizer controller receives processed data signals and controls one or more controllable analog filters based on one or more minimization algorithms for minimizing the error signal. For example, quasi-Newton, conjugate gradient, steepest descent, and/or other minimization algorithms may be used. Typically, an equalizer controller may control a controllable analog filter by changing the coefficients used by the controllable analog filter. Advantageously, according to a preferred embodiment of the current invention, any mismatch in controllable analog filter delay line segments may be assessed using the error function implemented in the error generator and compensated for by the minimization algorithm. Preferably, the controllable analog filter may be controlled using analog control signals and the equalizer controller may comprise a microprocessor capable of generating digital control signals. In this case, the digital control signals must be converted to analog signals in order to control the controllable analog filter. Preferably, a digital to analog converter (DAC) 262 may exist in an equalizer control module 250 as illustrated in FIG. 5. Alternately, one or more DACs may exist in other regions of the current invention. For example, a controllable analog filter may accept digital control signals and perform the digital to analog conversion within the controllable analog filter.

Preferably, the equalizer control module 200 may be implemented as one or more microprocessors 260. However, alternate embodiments according to the current invention may be implemented using custom hardware, software and/or firmware. According to a preferred embodiment of the current invention, excess capacity in the microprocessor 260 or alternate hardware, software and/or firmware may be used for a variety of purposes. For example, excess memory and/or storage capacity may be used to store equalizer performance history and/or device status data. Using excess processing power of the microprocessor 260 and/or alternate hardware, software and/or firmware, equalizer performance, capacity and/or device status may be assessed. For example, by monitoring the equalizer performance and/or settings, it may be possible for the microprocessor to determine if the equalizer is operating near, at or beyond its operating limit. Typically, equalizers have operating limits. In some cases, a preferred embodiment of the current invention may be installed and operate properly shortly after installation, but may operate beyond its operating limits a short time later due to serious degradation of input channel characteristics. Furthermore, once it has been determined that some element of the current invention is operating near, at or beyond its operating limits, it may be possible to provide notification of this device status or to take some automated, proactive action. Furthermore, an inline, non-invasive link monitor may be implemented according to an alternate embodiment of the current invention. For example, the quality of an optical link may be estimated by assessing the controllable analog filter coefficients and estimating the differential group delay caused by polarization mode dispersion by computing the frequency response of the controllable analog filter. Typically, polarization mode dispersion is a time-varying phenomenon. In some cases, historical data may be stored and a history of link quality statistics may be maintained. Preferably, configurations and/or algorithms may be managed using the control processor, hardware, firmware and/or software. Examples of management tasks may include: adding, reconfiguring, updating, upgrading, deploying, deleting and/or decommissioning configurations, control algorithms, and/or error functions. Furthermore, according to an alternate embodiment of the current invention, the control processor, hardware, firmware and/or software may be used for joint optimization of the filter coefficients with device parameters for devices internal to and/or external to the current invention. For example, a processor may be used to adjust or provide data for the adjustment of the gain parameters of a receiver in combination with adjusting controllable analog filter coefficient values. Similarly, provisions may be made to assess, control and/or compensate for chromatic dispersion effects and/or a variety of transponder features such as sampling phase, decision threshold levels, and DC offset levels. Optional control/data input and control/data output interfaces may be used to enable the transfer of control signals and/or data, into and/or out of an alternate embodiment of the current invention.

According to an alternate embodiment of the current invention, some elements of the current invention may be used in one or more modules. For example, referring to FIG. 5, ADC 207 may be used to convert analog signals from LPF 205 into digital signals that may be provided to equalizer control module 250. However, according to an alternate embodiment of the current invention comprising two or more error acquisition modules, a single ADC may be used to provide analog to digital conversion for more than one LPF and/or integrator. Similarly, according to an alternate embodiment of the current invention wherein one or more controllable analog filters comprise one or more DFE filters 103 as illustrated in FIG. 4, the same slicer may be used in both the DFE and one or more error generators.

Process Illustrations

Figure 7A:
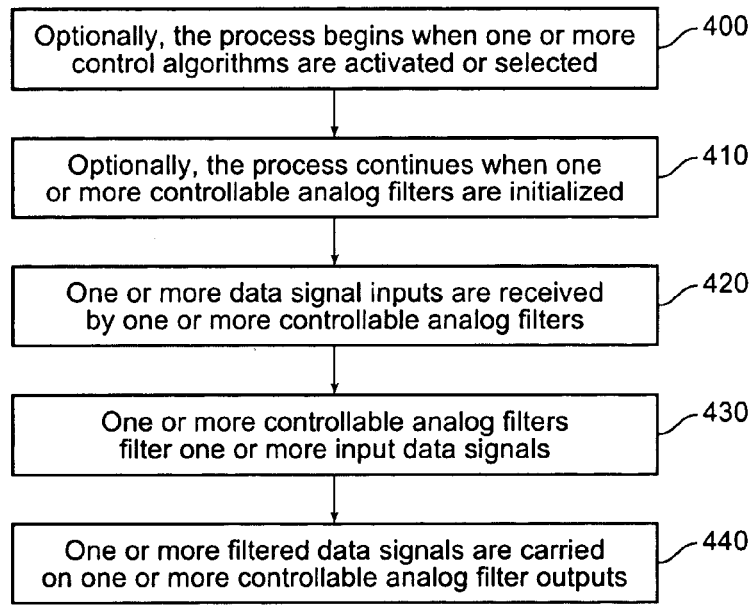
FIGS. 7a, b and c illustrate a process for improved high-speed adaptive equalization according to the current invention.
Figure 7B:
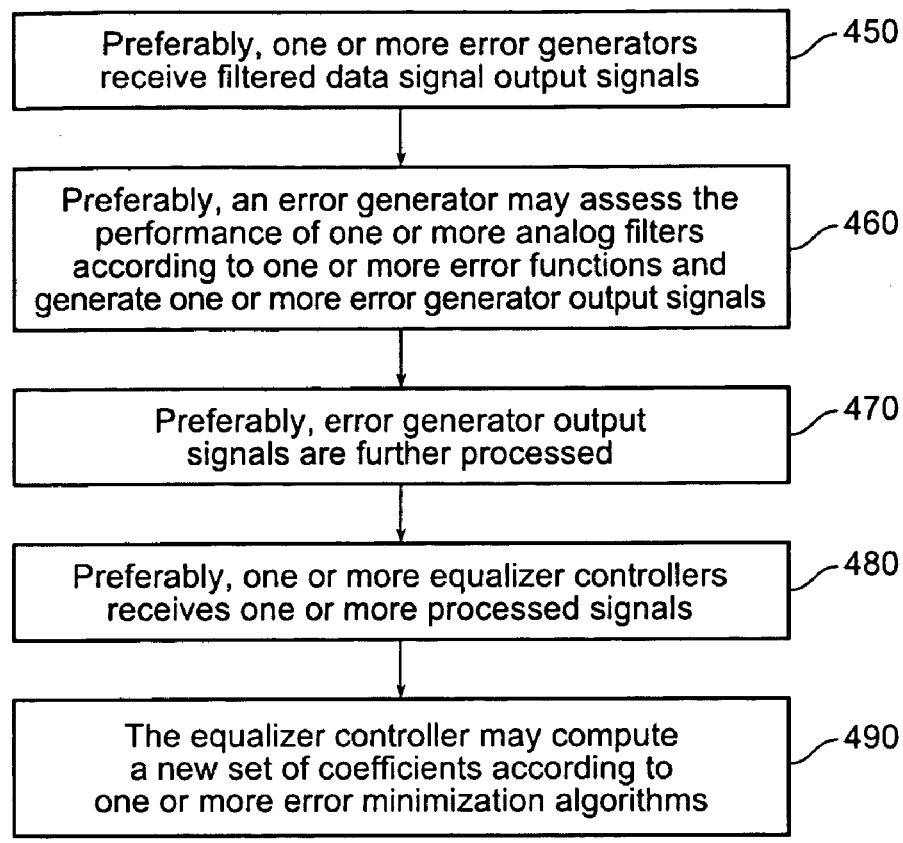
Figure 7C:
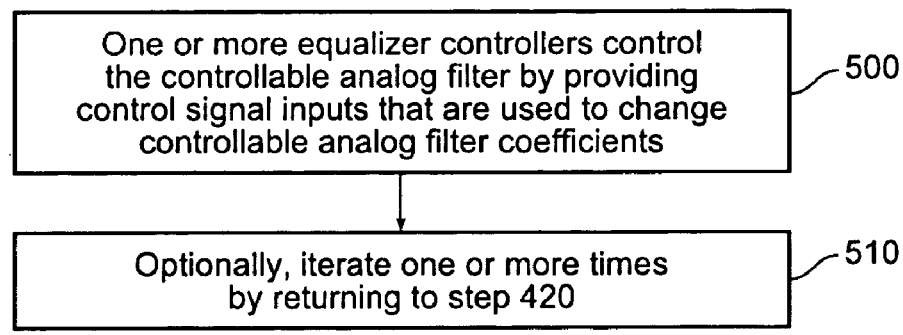

Referring to FIGS. 7*a, b* and *c*, these figures illustrate a process for improved high-speed adaptive equalization according to the current invention. Optionally, the process begins when one or more control algorithms are activated or selected (Step 400). Preferably, one or more of the algorithms comprise minimization algorithms that may be used for minimizing error signals such as quasi-Newton or steepest descent algorithms. Alternately, one or more control algorithms may be pre-configured. Optionally, the process continues when one or more controllable analog filters are initialized (Step 410). Typically, the step of initialization comprises setting the initial filter coefficients for one or more of the controllable analog filters. Preferably, the filter coefficients may be set to a "pass-through" mode such that an incoming signal may pass through the filter unchanged. However, in some cases, initial filter coefficients may be set based on external input, calculation and/or previously stored values. The process continues when one or more data signal inputs are received by one or more controllable analog filters (Step 420). Typically, the data signals may comprise high-speed signals such as, but not limited to, signals obtained from high-speed lightwave systems. In some cases, the signals may comprise analog, digital and/or sampled analog signals. The process continues when one or more controllable analog filters filter one or more input data signals (Step 430). Preferably, the step of filtering comprises filtering noise and/or compensating for channel impairment and/or imperfections such as inter-symbol interference. Preferably, a filter is controlled wholly or in part according to signals from one or more equalizer controllers. Typically, an equalizer controller may control a controllable analog filter by setting or adjusting one or more of the filter coefficients that may be used by the filter in providing a weighted sum of a delayed version of the input signal. The process continues when one or more filtered data signals are carried on one or more controllable analog filter outputs (Step 440). Preferably, one or more controllable analog filter outputs provide a filtered data signal output signal to one or more internal components of the current invention. Preferably, one or more controllable analog filter outputs provide a filtered data signal output signal to one or more components external to the current invention. However, signals may be further processed before they are provided to one or more external components in an alternate method according to the current invention. For example, in some cases, the filtered data signal output signal may be subject to a slicer operation before it is provided to external components. Preferably, the process continues when one or more error generators receive filtered data signal output signals (Step 450). Preferably, an error generator may assess the performance of one or more analog filters according to one or more error functions and generate one or more error generator output signals (Step 460). In some cases, filtered data signal output signals may be massaged before an error function is applied. For example, in some cases, it may be advantageous to apply a level shift and/or normalization function before the application of an error function. In some cases, a weighting function may be applied to the error generator signals before the error generator signals are provided as output. For example, a weighting function such as $w(t)=|x|^{\alpha}$ may be used to emphasize the error signal near the center of an "eye pattern" and de-emphasize the error signal near the zero crossings of an "eye pattern" without requiring the use of a clock. However, alternate examples of weighting functions may use data from a variety of sources such as internal or external clock modules to provide weighting. Typically, a large error signal generated by an error generator may indicate a poorly performing and/or incorrectly configured high-speed adaptive equalizer device whereas a small error signal may indicate a properly configured high-speed adaptive equalizer device. Preferably, the process continues when the error generator output signals are further processed (Step 470). Preferably, one or more error acquisition modules receives and processes one or more error generator output signals. Preferably, the error acquisition module applies one or more acquisition filters to the error generator output signals. For example, the error generator output signals may be processed by one or more anti-aliasing filters, noise reduction filters, low pass filters and/or integrators. Typically, an error acquisition module may sample the error generator output signals at a rate consistent with the operating speed of an equalizer controller. Preferably, the error generator output signals may be averaged with one or more low pass filters and/or integrators. Typically, the output of an error acquisition module may be digitized using an analog to digital converter so that digital error signal output may be provided. Optionally, timing input may be provided from an error acquisition module to one or more equalizer controllers for the purpose of enabling the management, monitoring and/or control of sampling rates and/or data acquisition intervals. Preferably, the process continues when one or more equalizer controllers receives one or more processed signals (Step 480). Preferably, the processed signals comprise error generator output signals processed by an error acquisition module. The equalizer controller may compute a new set of coefficients according to one or more error minimization algorithms (Step 490). One or more equalizer controllers control a controllable analog filter by providing control signal inputs that are used to change the controllable analog filter coefficients (Step 500). In some cases, the control signal inputs may comprise digital signals. Alternately, the control signal inputs may comprise analog signals. In the case where one or more digital control signal inputs are received by the controllable analog filter, the controllable analog filter may convert some or all of the incoming digital control signal inputs to analog signals. Optionally, iterate one or more times by returning to Step 420 (Step 510).

Figure 8A:
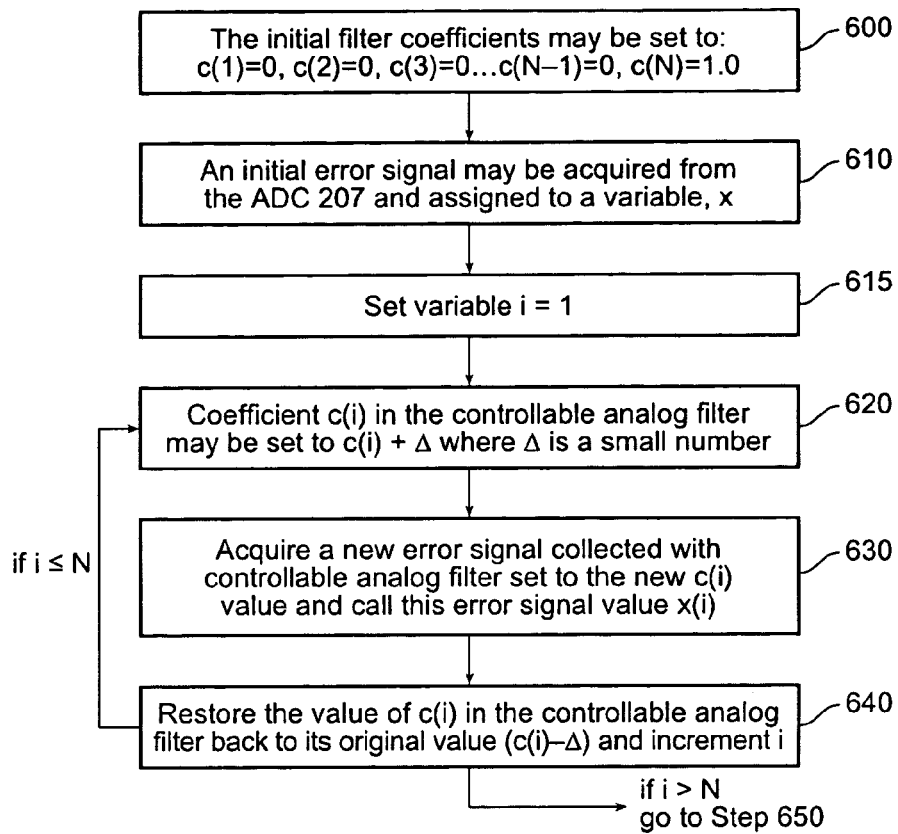
FIGS. 8a and b illustrate a detailed example of adjusting the controllable analog filter coefficients to minimize the error signal according to a steepest descent algorithm in a preferred embodiment of the current invention.

FIGS. 8*a* and *b* illustrate a detailed example of adjusting the controllable analog filter coefficients to minimize the error signal according to a steepest descent algorithm in a preferred embodiment of the current invention. This example is intended to help illustrate a preferred mode of operation. A variety of alternate modes are possible. For example, a variety of techniques for minimizing a multivariate function may be used according to the current invention. The following example is meant to represent only one of many possible approaches for adjusting the controllable analog filter coefficients for a preferred embodiment of the current invention. For this example, consider the digital to analog converter (DAC) 262 illustrated in FIG. 5 may generate 2D values that are uniformly spaced across a range. Alternate embodiments according to the current invention may use one or more different DACs such as, but not limited to, DACs providing values with non-uniform spacing and/or with differing ranges. For this example, the controllable analog filter 100 may be initialized by the equalizer controller 250 by using the DAC 262 to set the filter coefficients. In this example, the initial filter coefficients may be set to: $c(1)=0, c(2)=0, c(3)=0 \ldots c(N-1)=0, c(N)=1.0$ (Step 600). Steps 610, 615, 620, 630, 640, and 650 illustrate how an estimate of the gradient of the error signal may be made. An initial error signal may be acquired from the ADC 207 and assigned to a variable, x (Step 610). Set variable $i=1$ (Step 615). Coefficient $c(i)$ in the controllable analog filter may be set to $c(i)+\Delta$ where $\Delta$ is a small number (Step 620). For this example, $\Delta$ may be chosen as the smallest positive value represented by DAC 262. However, alternate selections for the value of $\Delta$ may be used. In some cases, a slightly larger $\Delta$ may be used. Alternately, the value of $\Delta$ may be variable. In alternate cases, the value of $\Delta$ may be determined by holding the value of $\Delta/x(i)$ roughly constant. Acquire a new error signal collected with controllable analog filter set to the new $c(i)$ value and call this error signal value $x(i)$ (Step 630). Restore the value of $c(i)$ in the controllable analog filter back to its original value $(c(i)-\Delta)$ and increment i (Step 640). Repeat steps 620, 630 and 640 for $i=2$ to N where N is the number of filter coefficients considered, producing $x(1)$, $x(2) \ldots x(N)$. Compute the gradient vector (Step 650). For example, the gradient vector may be represented as: $g(i)=(x(i)-x)/\Delta$ for $i=1, 2, \ldots N$. A variety of techniques may be used to estimate the gradient vector such as a backward difference technique, a forward difference technique, a centered difference technique, or others. In accordance with the present embodiment of the invention, the gradient vector can thus be estimated, as opposed to analytically calculated. As such, the system may continue to perform even when it is impossible to calculate an analytical expression for the gradient vector, or when it is impossible to evaluate the analytically calculated gradient because all of the necessary the data are not available. Furthermore, the system may thus operate more efficiently by avoiding the computational complexity that may be involved with analytical calculation of the gradient vector.

According to the present embodiment, each component of the gradient vector is determined by varying only one of the filter coefficients and detecting a resulting change in the error signal. According to an alternative embodiment of the invention, each component of the gradient vector is determined by varying more than one of the filter coefficients and detecting a resulting change in the error signal.

Figure 8B:
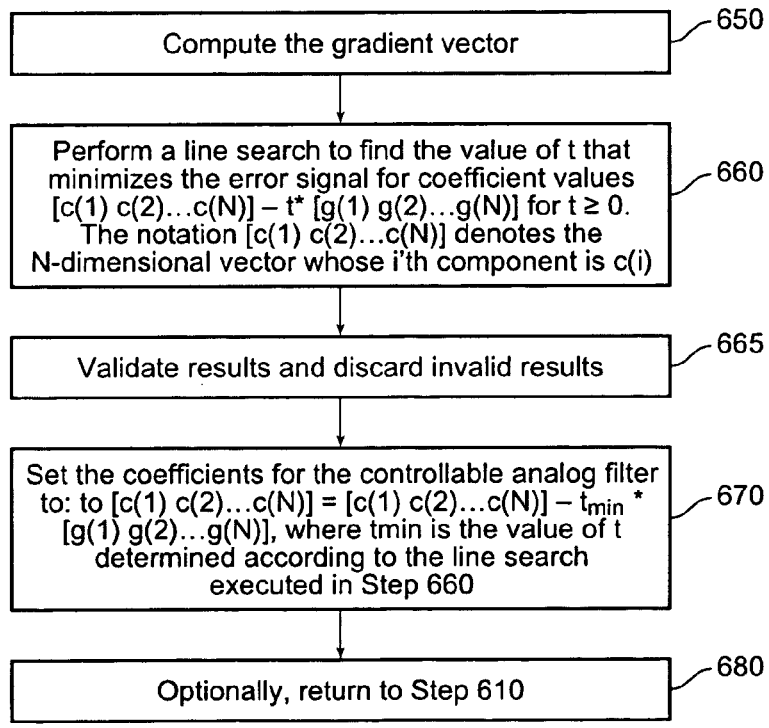

Referring back to FIG. 8*b*, a line search is performed to find the value of t that minimizes the error signal for coefficient values $[c(1) c(2) \ldots c(N)]-t^*[g(1) g(2) \ldots g(N)]$ for $t>=0$ (Step 660). For this example, the notation $[c(1) c(2) \ldots c(N)]$ is used to denote an N-dimensional vector whose i'th component is $c(i)$. For this example, the line search may be performed using Brent's method as described on pages 400–405 of Numerical Recipes in C, second edition, Cambridge University Press 1997, which we hereby incorporate by reference. However, alternate methods for performing a line search may be used. In some cases, the type of line search used may depend on the type of minimization technique used. Validate results and discard invalid results (Step 665). For example, in some cases, the line search may fail due to noise in the measured error value. For example, if the error value corresponding to the coefficient vector for tmin is not less than the measured error value for the original coefficient vector (t=0), the results may be considered suspect and should be discarded. For validated results, set the coefficients for the controllable analog filter to:

$$[c(1) c(2) \ldots c(N)] = [c(1) c(2) \ldots c(N)] - tmin^*[g(1) g(2) \ldots g(N)]$$

where tmin is the value of t determined according to the line search executed in Step 660 (Step 670). Optionally, return to Step 610 (Step 680). In this case, iteration may be used to converge to an optimum set of filter values. Iterative operation may also be used to respond dynamically to signals with time-varying noise and interference characteristics.

FEC and Signal Error Adaptive Equalization

Figure 21:
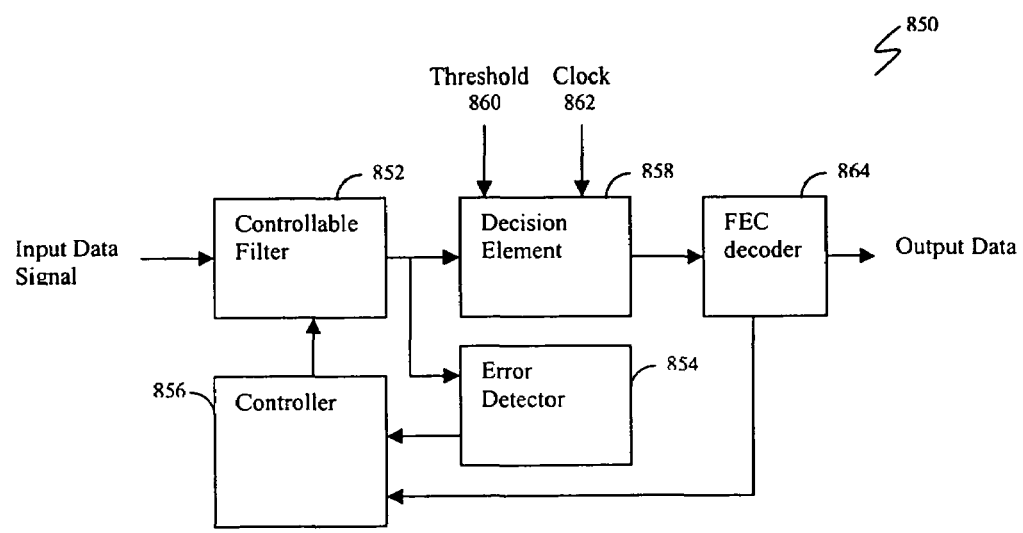
FIG. 21 is a block diagram one implementation of an adaptive equalizer that is capable of using information produced from Forward Error Correction (FEC) decode processing as well as information produced from evaluation of the filtered signal to perform adaptive equalization, in accordance with one embodiment of the present invention.

FIG. 21 is a block diagram of one implementation of an adaptive equalizer 850 that is capable of using information produced from Forward Error Correction (FEC) decode processing as well as information produced from evaluation of the filtered signal to perform adaptive equalization, in accordance with one embodiment of the present invention.

Adaptive equalizer 850 overcomes significant shortcomings faced by typical implementations of adaptive equalization based on FEC feedback. As discussed previously, equalizers using FEC feedback are known. However, use of FEC feedback in adaptive equalization typically requires a low bit error rate associated with FEC decoding. Higher bit error rates can cause this type of equalization scheme to converge too slowly or fail to converge at all. Indeed, equalization based on FEC feedback may be inoperable under certain noise and/or interference conditions.

Figure 22:
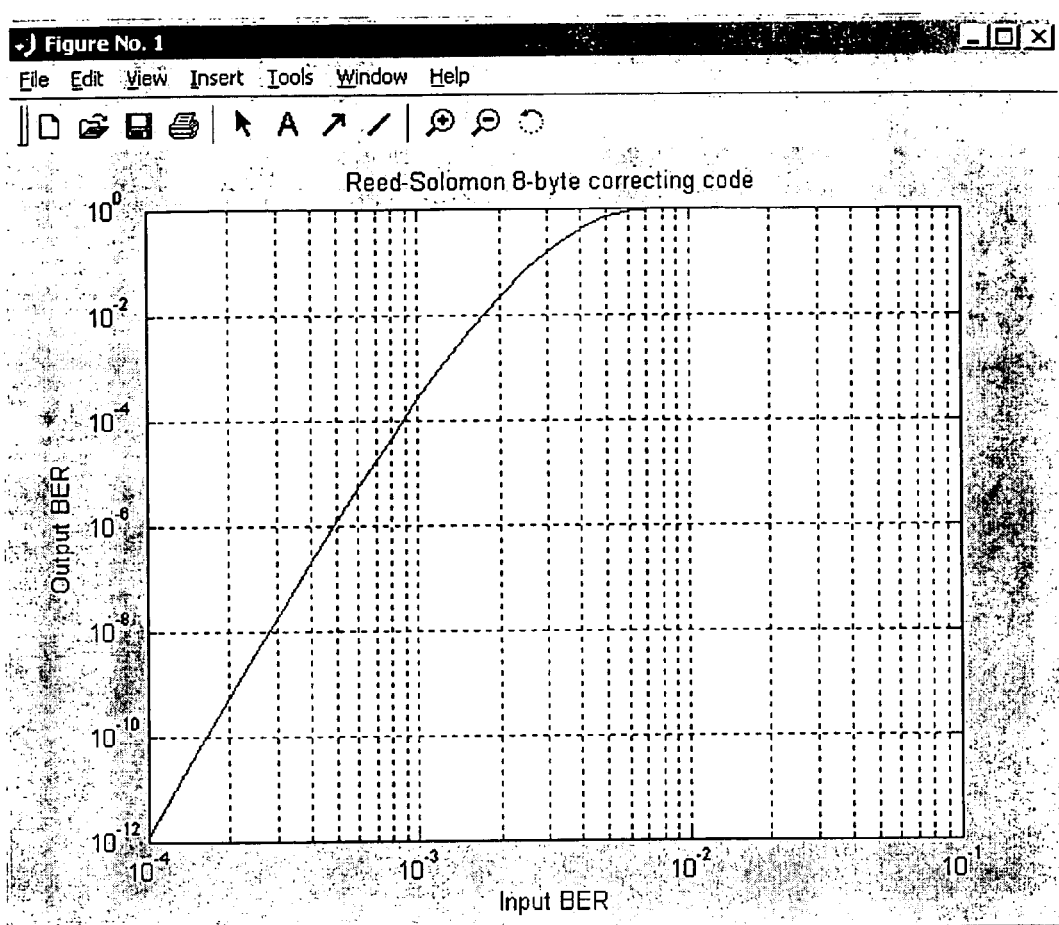
FIG. 22 shows the output (corrected) bit error rate as a function of the input (uncorrected) bit error rate for an eight-byte correcting Reed Solomon decoder using a block size of 255 bytes.
Figure 23:
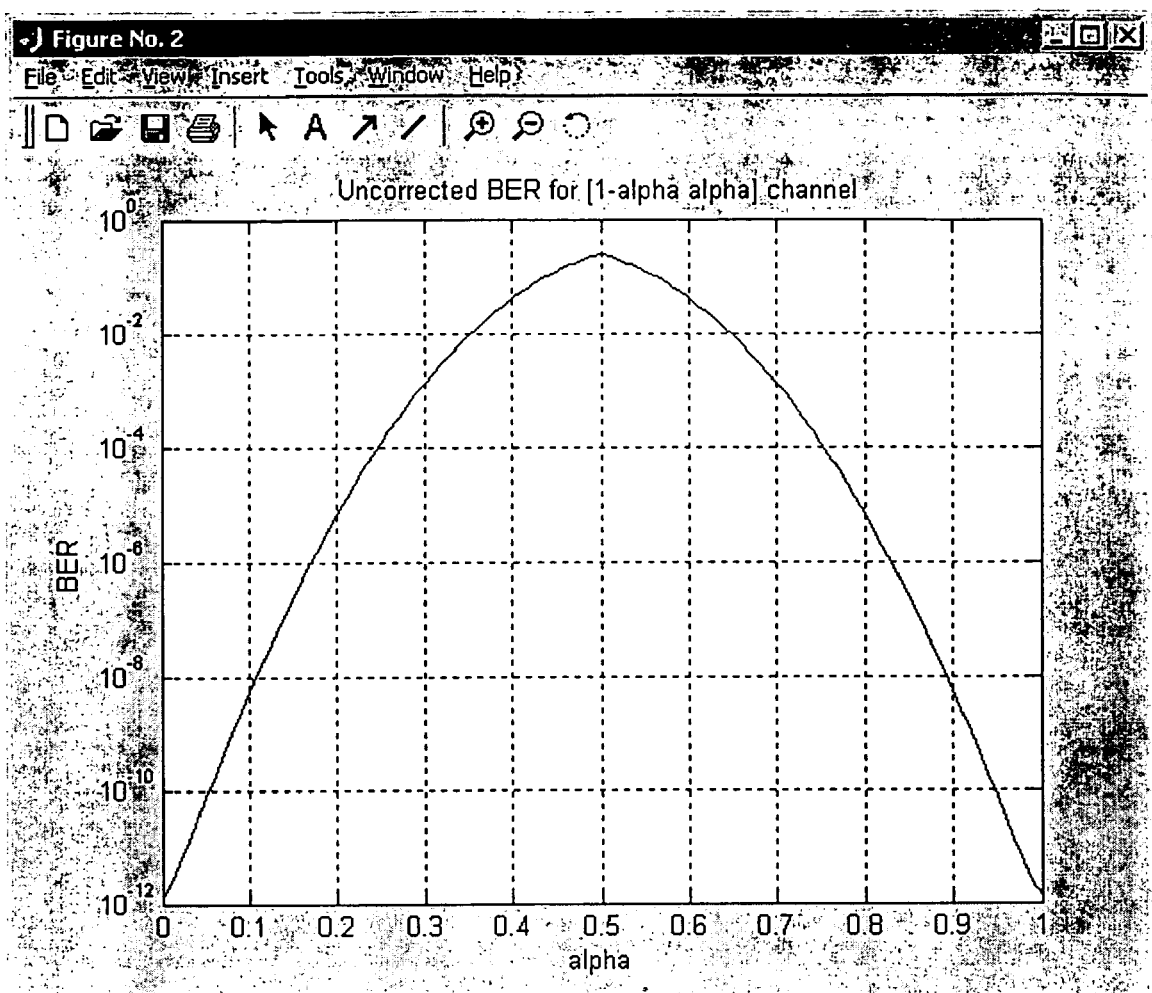
FIG. 23 shows the uncorrected bit error rate for a channel with an impulse response of [1-alpha alpha], as alpha changes from zero to one.

For example, a significant amount of inter-symbol interference (ISI) may cause the "eye" at the equalizer to be closed or almost closed when the equalizer begins its adaptation process such that the bit error rate may be too high to obtain useful FEC feedback for purposes of adaptive equalization. To illustrate this point, FIG. 22 shows the output (corrected) bit error rate as a function of the input (uncorrected) bit error rate for an eight-byte correcting Reed Solomon decoder using a block size of 255 bytes. It can be seen from FIG. 22 that the output bit error rate of the Reed Solomon decoder becomes flat when the input bit error exceeds approximately 0.007. FIG. 23 shows the uncorrected bit error rate for a channel with an impulse response of [1-alpha alpha], as alpha changes from zero to one. Here, it is assumed that the receiver has a signal to noise ratio of 17 dB when alpha is equal to zero. Note that the uncorrected bit error rate of the channel is larger than 0.01 when alpha is in the range where 0.35<alpha<0.65.

Figure 24:
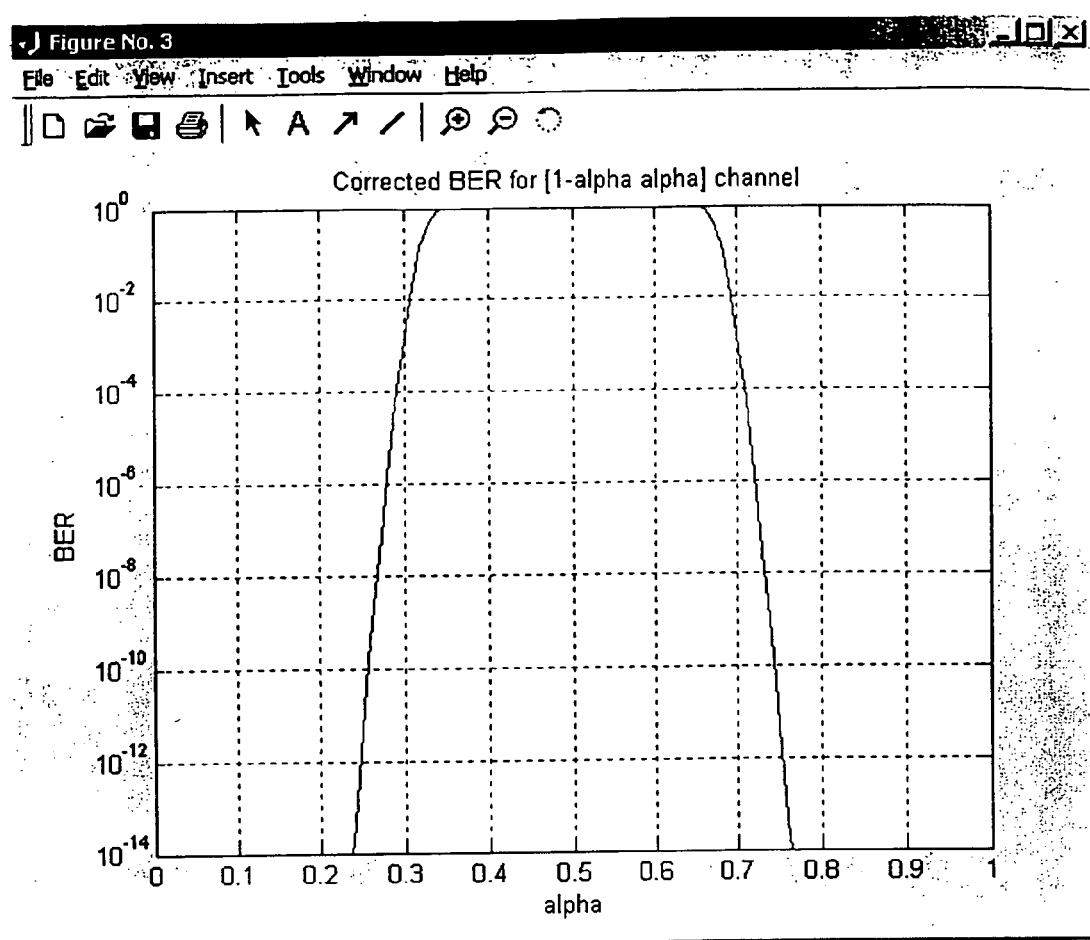
FIG. 24 combines FIGS. 22 and 23 to show how the corrected bit error rate for the [1-alpha alpha] channel varies as a function of alpha.

For a signal transmitted through a channel characterized by FIG. 23 and processed using an FEC decoder characterized by FIG. 22, adaptive equalization based on FEC feedback may have significant difficulties. Specifically, FIG. 24 combines FIGS. 22 and 23 to show how the corrected bit error rate for the [1-alpha alpha] channel varies as a function of alpha. This plot exhibits a nearly flat region when alpha falls between 0.35 and 0.65 such that any adaptation algorithm that relies on FEC feedback under these conditions may not be able to operate at all.

Figure 25:
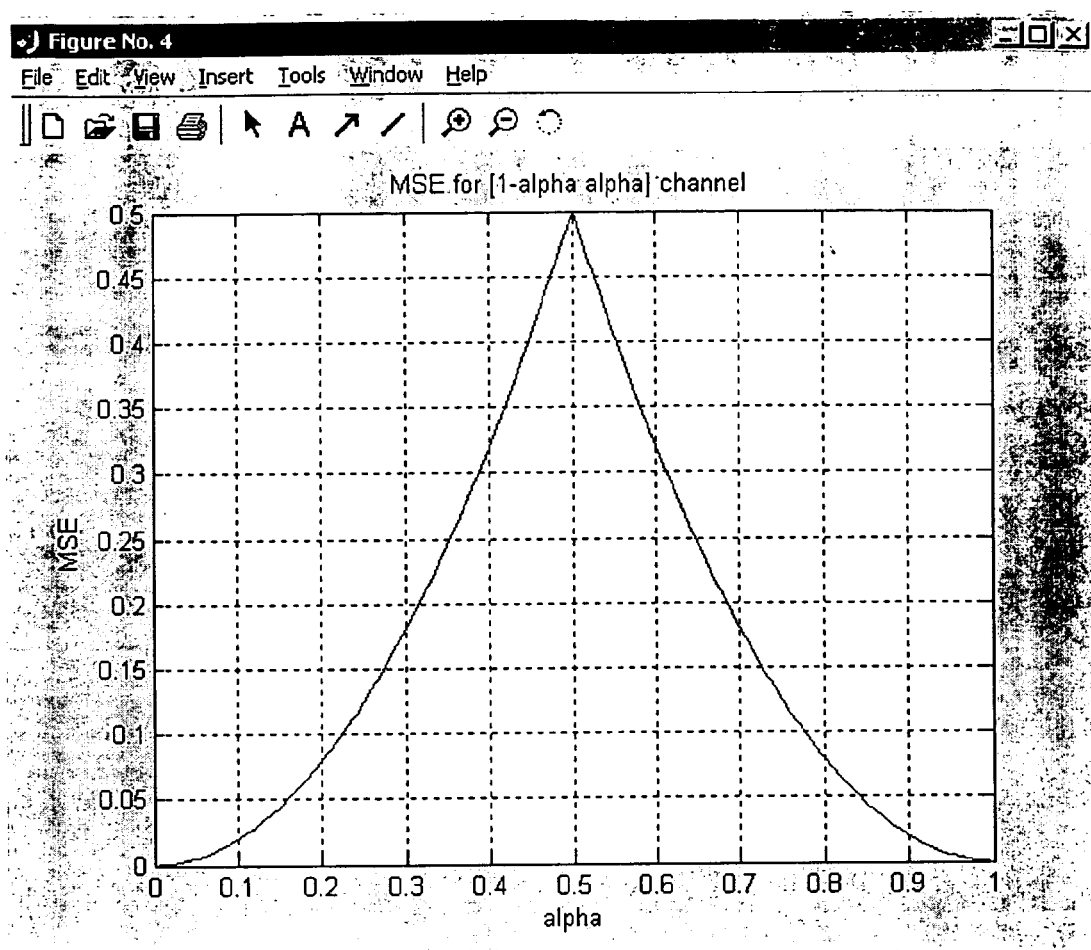
FIG. 25 shows the mean-squared-error (MSE) value for the [1-alpha alpha] channel as a function of alpha.

By contrast, FIG. 25 shows the mean-squared-error (MSE) value for the same [1-alpha alpha] channel as a function of alpha. MSE is an example of a signal error output that is generated from evaluating the signal after it has been filtered by the adaptive equalizer. Here, mean-squared error (MSE) is defined as $(x-sgn(X))^2$, where x is the signal and sgn( ) denotes the signum function. Note that this MSE graph does not contain any flat regions that may cause problems for an adaptive equalizer as discussed above.

According to one embodiment of the present inventions, adaptive equalization is performed using an FEC output, as well as a signal error output. Here, FEC output refers to information generated by the FEC decode process. One example of FEC output is simply a bit error rate, which can be an input bit error rate or an output bit error rate associated with the FEC decode process. Another example is a bit error count, which can be an input bit error count or an output bit error count associated with the FEC decode process. Of course, the FEC output needs not be restricted to these examples and can relate to other information generated during any portion of FEC decode processing. Signal error output refers to information generated from evaluating the signal that is filtered by the adaptive filter. As mentioned above, one example of the signal error output is MSE. Of course, the signal error output may relate to other types of information generated from examining the filtered signal.

Referring back to FIG. 21, adaptive equalizer 850 receives an input data signal from the channel. Here, the input data signal is an FEC encoded signal that has been transmitted through a channel associated with ISI and noise. A controllable filter 852 processes the input data signal and produces a filtered signal. Controllable filter 852 may be implemented as a controllable analog filter or a controllable digital filter. If controllable filter 852 is implemented as a digital filter, the input data signal and the filtered signal may be in digital form. An error detector 854 receives the filtered signal and generates a signal error output from the filtered signal. Error detector 854 may comprise an eye monitor, which can measure the remaining ISI after filtering. Error detector 854 could calculate MSE, or use other statistics of the signal path to indicate signal error such as distortions caused by ISI. A controller 856 receives the signal error output and generates a control signal, which is provided to the controllable filter 852. The control signal is capable of adjusting one or more coefficients associated with controllable filter 852.

Here, the structure and operation of controllable filter 852, error detector 854, and controller 856 may be the same or similar to that of the adaptive equalization processes illustrated by adaptive equalizer 90 of FIG. 3. For example, controllable filter 852 may be implemented as a tapped delay line filter employing differential delay cells, as shown in FIG. 9. Error detector 854 may utilize one of the implementations shown in FIGS. 11, 13a, 13b, 15, and 16. Thus, different error functions may be adopted by error detector 854. Further, controller 856 may include a processor as shown in equalizer controller 250 of FIG. 5.

Adaptive equalizer 850 may also include a decision element 858 that receives the filtered signal from the controllable filter 852 and produces hard and/or soft data decisions. Decision element 858 may produce a hard decision using a limiting amplifier, flip-flop, Clock and Data Recovery (CDR) element, or other device which converts an analog signal into a symbol—for example a "1" or "0" for a binary system. Decision element 858 may alternatively comprise an analog to digital converter that outputs soft data decisions of a specified precision. Decision element 858 may receive a threshold input 860 and/or a clock input 862 that facilitate the generation of data decisions. If the controllable filter is implemented as a digital filter, decision element 858 may not be needed.

Adaptive equalizer 850 further includes an FEC decoder 864 that receives the data decisions from decision element 858 and performs FEC decode processing to generate an FEC output. Here, FEC decode processing refers to any processing relating to an FEC decoding procedure, which may or may not generate a data output of corrected bits. The FEC output may be a bit error rate, a bit error count, or some other information produced from the FEC decode process. The FEC output is provided to controller 856, which generates the control signal used to adjust the coefficients associated with controllable filter 852. As shown in FIG. 21, FEC decoder 864 produces not only the FEC output, but also data representing corrected bits having a reduced bit error rate. While FEC decoder 864 is shown, other devices performing FEC decoding processing may be used to generate the FEC output.

According to the present embodiment of the invention, adaptive equalizer 850 may initially perform adaptive equalization using the signal error output (e.g., MSE), then perform adaptive equalization using the FEC output (e.g., bit error rate). Accordingly, the filter coefficients associated with controllable filter 852 may first be adjusted to minimize the MSE by operation of controllable filter 852, error detector 854, and controller 856. Once a particular condition is reached, adaptive equalizer 850 switches to an FEC-based procedure. Then, the filter coefficients associated with controllable filter 852 may be adjusted to minimize the bit error rate, by operation of controllable filter 852, decision element 858, FEC decoder 864, and controller 856. Thus, the signal error output and the FEC output represent different error measures available to adaptive equalizer 850. The condition by which the adaptive equalizer 850 switches from using the signal error output to using the FEC output may be defined in a wide range of different ways, as described below.

In one embodiment, the condition may be based on the FEC output. For example, the condition may be that the bit error rate has fallen below a specified threshold, which could indicate that the FEC output has become valid and useful to the equalization process. For purposes of illustration only, if a Reed-Solomon 7% overhead FEC code is implemented, the threshold may be set to, say, 1e–3. Thus, adaptive equalizer 850 may switch to an FEC-based adaptive equalization procedure once the bit error rate falls below 1e–3. Of course, this particular threshold value is only an illustration, and other threshold values may be used. Alternatively, the condition may be that the bit error rate has not changed significantly in N iterations of filter coefficient adjustments based on the MSE, where N is a specified positive integer. This may indicate that MSE-based adaptive equalization has converged. This may also be seen as an indication that MSE-based adaptive equalization has been used to the best of its capability, and continuing to perform MSE-based adaptive equalization is not expected to further improve performance. In another embodiment, the condition may be based on the signal error output. For example, the condition may be that the MSE has fallen below a specified threshold, or that the MSE has not changed significantly in N iterations, where N is a specified positive integer. In still another embodiment, the condition may be based on a combination of the FEC output, the signal error output, and/or other factors.

An advantage of first performing MSE-based adaptive equalization, then performing FEC-based adaptive equalization, is that the equalizer is allowed to adapt itself even in situations where the channel impulse response would cause difficulty for FEC-based adaptive equalization. When MSE-based adaptive equalization converges, equalization is sufficiently achieved that the FEC adaptive equalization may no longer have significantly difficulties. Furthermore, even in situations where FEC-based adaptive equalization may be able to converge on its own, it may still be desirable to initially use the MSE-based equalization to reduce the total number of iterations needed to achieve convergence of FEC-based adaptive equalization. After the FEC adaptive equalization converges the equalizer may have a solution that is superior to the MSE solution. The FEC solution may be superior to the MSE solution for various reasons. For instance, the signal path into or inside of decision element 858 may introduce its own ISI. Also, non-linearities in signal or noise contributions in the channel may make the MSE solution non-optimal.

There are other advantages associated with the technique described above. First, the proximity of the error detector 854 to the controllable filter 852 and controller 856 may contribute to a quicker response time and thus faster convergence. By contrast, the data line between the FEC decoder 864 and the controller 856 may be a slower link, which would contribute to a slower response time. Further, FEC output such as an FEC bit error rate or an FEC bit error count often needs to be accumulated before it can be transmitted to the controller 856, which could take time. For example, if approximately 100–1000 error counts must be accumulated to get a reasonably accurate estimate of the bit error rate, and a Binomial distribution of randomly occurring error counts is used, this would indicate a substantial reduction of the speed at which useful information is fed back to controller 856. Thus, convergence may be faster when fewer iterations using the FEC output are required. Second, as discussed earlier, FEC information may provide little or no information useful for equalization when severe ISI is present. In such a case, adjustments to the coefficients associated with controllable filter 852 can essentially be random, and little or no progress will be made towards a correct solution. Third, in many cases, the MSE solution, though not as good as the FEC solution in many respects, may still be sufficient to achieve the desired bit error rate. In such a case, the convergence time may be independent of FEC feedback characteristics.

Adaptive equalizer 850 may also revert back to equalization based on the signal error output, such as MSE, under certain circumstances. For example, if adaptive equalizer 850 switched from using the signal error output to using the FEC output as the bit error rate fell below 1e-3, adaptive equalizer 850 may revert back to MSE-based adaptive equalization if the bit error rate climbs back above 1e-3. Of course, other conditions may be defined for when adaptive equalizer 850 is to revert back to equalization based on signal error output.

Further, adaptive equalizer 850 needs not be restricted to the initial performance of equalization based on the signal error output, followed by equalization based on the FEC output. In fact, adaptive equalizer 850 may use signal error output at certain times and use FEC output at other times, depending on the circumstances. For example, if the channel is varying relatively slowly, adaptive equalizer 850 may perform adaptive equalization based on the FEC output only. Or, adaptive equalizer 850 may first perform adaptive equalization based on the signal error output, then perform adaptive equalization based on the FEC output. On the other hand, if the channel is varying relatively rapidly, adaptive equalizer 850 may perform adaptive equalization based on the signal error output only. Measurements performed at the error detector 854, such as eye monitor measurements, may help to determine whether the channel is varying slowly or rapidly. Thus, adaptive equalizer 850 can select equalization procedure based on a measurement of time-dependent variation of the channel. This may allow the same system to be used to compensate for effects of Chromatic Mode Dispersion (CMD) and Polarization Mode Dispersion (PMD). For example, for a channel dominated by CMD, which is not likely to vary significantly with time, the system may perform adaptive equalization based on the FEC output only, or perform adaptive equalization based on signal error output followed by adaptive equalization based on the FEC output. For a channel dominated by PMD, which may vary significantly with time, the same system may perform adaptive equalization based on a signal error output only, such as MSE. Thus, according to the present embodiment of the invention, adaptive equalizer 850 may have different and flexible ways of utilizing its capabilities for adaptive equalization based on signal error output and FEC output.

Adaptive equalizer 850 may also be used to detect and resolve problems encountered during MSE-based adaptive equalization. For example, an adaptive equalization algorithm based on the MSE may fall into local minima, at which point the algorithm may be unable to improve the feedback value with small displacements of the filter coefficients. Adaptive equalizer 850 may be able to detect such a scenario by observing a failure of the FEC decoder 864 to lock. In response, the controller 866 may restart the convergence process from a different set of initial filter coefficient values for the controllable filter 852.

In accordance with another embodiment of the present invention, operation of decision element 858 may also utilize the signal error output as well as the FEC output. Typically, at a unit such as decision element 858, a decision is determined by comparing the incoming signal (e.g., the filtered signal) to at least one reference voltage level (e.g., threshold input 860) at a particular instant (e.g., clock input 862). The sampling time can come from a clock recovery circuit (not shown in FIG. 21) using some version of the incoming data signal, possibly from before or after the controllable filter 852. For example, the phase of the clock can be adjusted approximately using the signal error output generated by error detector 854, then fine-tuned using the FEC output generated by the FEC decoder 864. In a similar manner, the decision threshold can be approximately adjusted using the signal error output, then fine-tuned using the FEC output.

System Environment

Figure 19:
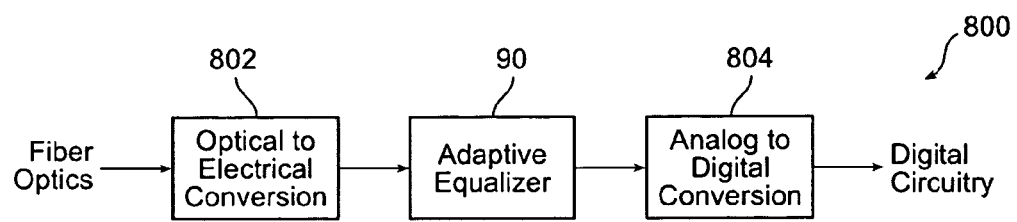
FIG. 19 is block diagram of an optical receiver 800 containing an adaptive equalizer 90 in accordance with one embodiment of the present invention.

FIG. 19 is block diagram of an optical receiver 800 containing an adaptive equalizer 90 (or an adaptive equalizer 850) in accordance with one embodiment of the present invention. The optical receiver 800 contains an optical to electrical conversion block 802. The optical to electrical conversion block 802 converts optical signals from fiber optics equipment into electrical signals. For example, electrical conversion block 802 may contain one or more photodiodes that detect optical signals and produce electrical signals. Electrical signals from the optical to electrical conversion block 801 are provided to the adaptive equalizer 90, which performs equalization to reduce channel effects such as ISI and/or others, as described previously. According to the present embodiment, the output of the adaptive equalizer 90 is in the form of analog electrical signals, which are provided to an analog to digital conversion block 804. The analog to electrical conversion block 804 converts the analog signals into electrical signals.

This may be done using devices such as a sampler. The output of the analog to digital conversion block 804 is then provided to digital circuitry.

Figure 20:
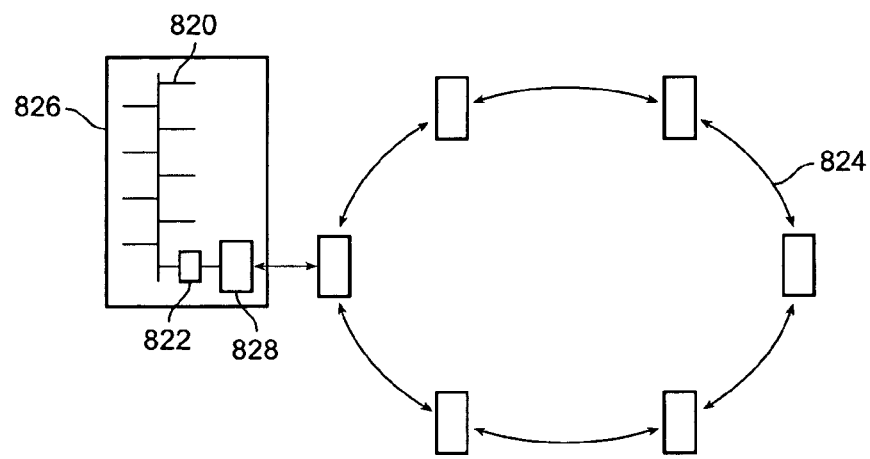
FIG. 20 depicts a local area network (LAN) 820 that employs an optical interface 822 and is coupled to a wide area network (WAN) 824, in accordance with one embodiment of the present invention.

FIG. 20 depicts a local area network (LAN) 820 that employs an optical interface 822 and is coupled to a wide area network (WAN) 824, in accordance with one embodiment of the present invention. Optical interface 822 may contain optical transmitter and optical receiver equipment. Specifically, optical interface 822 may contain one or more optical receivers 800 as described previously. LAN 820 may be implemented in a loop, star, bus, and/or other configuration. Further, LAN 820 may be a single local area network or a local area network connected with other networks. FIG. 20 shows LAN 820 as being situated inside a building 826 and serving as part of the optical networking infrastructure of the building 826. LAN 820 may be referred to as "risers" or "pipes" in this contexts. Just as an example, LAN 820 may constitute an optical network using multi-mode optical fibers carrying traffic at rates of approximately 10 Gbps. Other types of optical fibers and rates may also be implemented.

As shown, LAN 820 is coupled to the optical interface 822, which is coupled to a server 828. Optical interface 822 receives optical signals from LAN 820 and provides signals suitable for server 828. Although not shown, there may be other optical interfaces, similar to optical interface 822, used in conjunction with LAN 820. Server 828 is in turn coupled to WAN 824. WAN 824 may be implemented in a loop, star, bus, and/or other configuration. Further, WAN 824 may be a single wide area network or a wide area network connected with other networks. For example, WAN 824 may comprise the network of computers commonly known as the Internet.

The foregoing described embodiments of the invention are provided as illustrations and descriptions. They are not intended to limit the invention to the precise form described. For example, although a steepest descent minimization technique is used to illustrate the operation of the current invention, a wide variety of minimization techniques may be used instead of or in addition to the steepest descent technique. In particular, the Applicants contemplate that functional implementation of the invention described herein may be implemented equivalently in hardware, software, firmware, or other available functional components or building blocks. Also, the process steps describing the methods may be re-arranged and/or re-ordered. Other variations and embodiments are possible in light of above teachings, and it is thus intended that the scope of invention not be limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A method for performing adaptive equalization comprising:
   receiving a Forward Error Correction (FEC) encoded signal from a channel;
   filtering the received FEC encoded signal using a filter according to at least one adjustable filter coefficient to produce a filtered signal;
   evaluating the filtered signal to generate a signal error output;
   adjusting the at least one adjustable filter coefficient in response to the signal error output;
   performing FEC decode processing dependent on the filtered signal to generate an FEC output;
   adjusting the at least one adjustable filter coefficient in response to the FEC output;
   wherein the at least one adjustable filter coefficient is first adjusted in response to the signal error output, then adjusted in response to the FEC output;
   wherein the at least one adjustable filter coefficient is first adjusted in response to the signal error output until a specified condition is met, then adjusted in response to the FEC output; and
   wherein the specified condition relates to an error measure varying less than a predetermined amount in N iterations of adjusting the at least one adjustable filter coefficient, where N is a positive integer.

2. The method of claim 1 wherein the signal error output relates to Mean Squared Error (MSE).

3. The method of claim 1 wherein the FEC output relates to bit error rate.

4. The method of claim 1 wherein the FEC output relates to bit error count.

5. The method of claim 1 wherein the at least one adjustable filter coefficient is selectively adjusted in response to the signal error output of the FEC output.

6. The method of claim 5 wherein the selective adjustment in response to the signal error output or the FEC output is selected based on a measurement of time-dependent variation of the channel.

7. A method for performing adaptive equalization comprising:
   receiving a Forward Error Correction (FEC) encoded signal from a channel;
   filtering the received FEC encoded signal using a filter according to at least one adjustable filter coefficient to produce a filtered signal;
   evaluating the filtered signal to generate a signal error output;
   adjusting the at least one adjustable filter coefficient in response to the signal error output;
   performing FEC decode processing dependent on the filtered signal to generate an FEC output:
   adjusting the at least one adjustable filter coefficient in response to the FEC output;
   further comprising:
      generating a plurality of symbols from the filtered signal based on a symbol decision clock and a symbol decision threshold, wherein the FEC decode processing is performed on the symbols;
      adjusting the symbol decision clock in response to the signal error output; and
      adjusting the symbol decision clock in response to the FEC output.

8. A method for performing adaptive equalization comprising:
   receiving a Forward Error Correction (FEC) encoded signal from a channel;
   filtering the received FEC encoded signal using a filter according to at least one adjustable filter coefficient to produce a filtered signal;
   evaluating the filtered signal to generate a signal error output;
   adjusting the at least one adjustable filter coefficient in response to the signal error output;
   performing FEC decode processing dependent on the filtered signal to generate an FEC output;
   adjusting the at least one adjustable filter coefficient in response to the FEC output;
   further comprising generating a plurality of symbols from the filtered signal based on a symbol decision clock and a symbol decision threshold, wherein the FEC decode processing is performed on the symbols;
   adjusting the symbol decision threshold in response to the signal error output; and
   adjusting the symbol decision threshold in response to the FEC output.

9. An apparatus for performing adaptive equalization comprising:
   a filter capable of filtering a Forward Error Correction (FEC) encoded signal received from channel according to at least one adjustable filter coefficient to produce a filtered signal;
   an error detector adapted to evaluate the filtered signal to generate a signal error output;
   an FEC decoder adapted to perform FEC decode processing dependent on the filtered signal to generate an FEC output;
   a controller for adjusting the at least one adjustable filter coefficient in response to the signal error output and adjusting the at least one adjustable filter coefficient in response to the FEC output;
   wherein the controller is adapted to first adjust the at least one adjustable filter coefficient in response to the signal error output, then adjust the at least one adjustable filter coefficient in response to the FEC output;
   wherein the controller is adapted to first adjust the at least one adjustable filter coefficient in response to the signal error output until a specified condition is met, then adjust the at least one adjustable filter coefficient in response to the FEC output; and
   wherein the specified condition relates to an error measure varying less than a predetermined amount in N iterations of adjusting the at least one adjustable filter coefficient, where N is a positive integer.

10. The apparatus of claim 9 wherein the signal error output relates to Mean Squared Error (MSE).

11. The apparatus of claim 9 wherein the FEC output relates to bit error rate.

12. The apparatus of claim 9 wherein the FEC output relates to bit error count.

13. The apparatus of claim 9 wherein the controller is adapted to selectively adjust the at least one adjustable filter coefficient in response to the signal error output or the FEC output.

14. The apparatus of claim 13 wherein the controller selects to adjust the at least one filter coefficient in response to the signal error output or the FEC output based on a measurement of time-dependent variation of the channel.

15. An apparatus for performing adaptive equalization comprising:
   a filter capable of filtering a Forward Error Correction (FEC) encoded signal received from channel according to at least one adjustable filter coefficient to produce a filtered signal;
   an error detector adapted to evaluate the filtered signal to generate a signal error output;
   an FEC decoder adapted to perform FEC decode processing dependent on the filtered signal to generate an FEC output;
   a controller for adjusting the at least one adjustable filter coefficient in response to the signal error output and adjusting the at least one adjustable filter coefficient in response to the FEC output;
   further comprising a decision element for generating a plurality of symbols from the filtered signal based on a symbol decision clock and a symbol decision threshold, wherein the FEC decoder is adapted to perform FEC decode processing on the generated symbols; and
   wherein the symbol decision clock is capable of being adjusting in response to the signal error output and adjusted in response to the FEC output.

16. An apparatus for performing adaptive equalization comprising:
   a filter capable of filtering a Forward Error Correction (FEC) encoded signal received from channel according to at least one adjustable filter coefficient to produce a filtered signal;
   an error detector adapted to evaluate the filtered signal to generate a signal error output;
   an FEC decoder adapted to perform FEC decode processing dependent on the filtered signal to generate an FEC output;
   a controller for adjusting the at least one adjustable filter coefficient in response to the signal error output and adjusting the at least one adjustable filter coefficient in response to the FEC output;
   further comprising a decision element for generating a plurality of symbols from the filtered signal based on a symbol decision clock and a symbol decision threshold, wherein the FEC decoder is adapted to perform FEC decode processing on the generated symbols; and
   wherein the symbol decision threshold is capable of being adjusted in response to the signal error output and adjusted in response to the FEC output.

* * * * *